(12) United States Patent
Schachter et al.

(10) Patent No.: US 10,946,914 B2
(45) Date of Patent: Mar. 16, 2021

(54) CHAIN ASSEMBLY AND A BICYCLE LOCK MANUFACTURED THEREFROM

(71) Applicant: Adamant Conceptions Inc., Victoria (CA)

(72) Inventors: Michael Schachter, Victoria (CA); Ryan Lee, Victoria (CA)

(73) Assignee: Adamant Conceptions Inc., Victoria (CA)

(*) Notice: Subject to any disclaimer, the term of this patent is extended or adjusted under 35 U.S.C. 154(b) by 244 days.

(21) Appl. No.: 16/219,579

(22) Filed: Dec. 13, 2018

(65) Prior Publication Data
US 2019/0176918 A1 Jun. 13, 2019

Related U.S. Application Data

(60) Provisional application No. 62/598,204, filed on Dec. 13, 2017.

(51) Int. Cl.
| | | |
|---|---|---|
| *B62H 5/00* | (2006.01) | |
| *B33Y 80/00* | (2015.01) | |
| *B22F 5/00* | (2006.01) | |
| *E05B 71/00* | (2006.01) | |
| *E05B 67/38* | (2006.01) | |
| *B22F 5/10* | (2006.01) | |
| *B22F 7/00* | (2006.01) | |

(52) U.S. Cl.
CPC ............ *B62H 5/003* (2013.01); *B22F 5/106* (2013.01); *B22F 7/008* (2013.01); *B33Y 80/00* (2014.12); *E05B 67/383* (2013.01); *B22F 2005/004* (2013.01); *B22F 2301/205* (2013.01); *B22F 2301/35* (2013.01)

(58) Field of Classification Search
CPC ....... B62H 5/003; E05B 67/383; E05B 71/00; B22F 5/106; B22F 7/008; B22F 2301/35; B22F 2005/004; B22F 2301/205; F16G 15/12; F16G 15/10; F16G 15/14; A44C 5/02; A44C 5/10; A44C 5/102
USPC ....... 70/14, 18, 30, 49, 53, 58, 233; 63/4, 9, 63/38; 59/78, 80, 82, 84, 90; 138/109
See application file for complete search history.

(56) References Cited

U.S. PATENT DOCUMENTS

| | | | |
|---|---|---|---|
| 232,814 A | * | 10/1880 | Granbery |
| 925,309 A | | 6/1909 | Dickey |
| 2,192,946 A | * | 3/1940 | Towner ................ F42B 39/005 |
| | | | 102/528 |
| 3,994,126 A | | 11/1976 | Rieth |
| 4,503,665 A | | 3/1985 | Bert |
| 4,618,056 A | | 10/1986 | Cutshall |

(Continued)

FOREIGN PATENT DOCUMENTS

| | | |
|---|---|---|
| DE | 102004048640 | 4/2006 |
| EP | 0 629 364 A1 | 12/1994 |

(Continued)

*Primary Examiner* — Lloyd A Gall
(74) *Attorney, Agent, or Firm* — Nicholas Garner; Oyen Wiggs Green & Mutala LLP

(57) ABSTRACT

There is provided a chain apparatus made at least in part by additive manufacturing. The apparatus includes a pair of spaced-apart annular members. The apparatus includes an elongate member coupled to and extending between the annular members. At least one of the members comprises one or more self-draining internal chambers to allow for removal of residual material therefrom.

23 Claims, 16 Drawing Sheets

(56) References Cited

U.S. PATENT DOCUMENTS

| | | | |
|---|---|---|---|
| 5,305,540 A | 4/1994 | Rosermasser | |
| 5,452,572 A | 9/1995 | Alvaro et al. | |
| 5,487,264 A | 1/1996 | Strobel | |
| 5,531,065 A | 7/1996 | Rozenwasser | |
| 5,537,812 A | 7/1996 | Rozenwasser | |
| 5,549,440 A | 8/1996 | Cholakon et al. | |
| 5,605,038 A | 2/1997 | Rozenwasser | |
| 5,660,036 A | 8/1997 | Rozenwasser | |
| 6,460,323 B1 | 10/2002 | Rosenwasser et al. | |
| 6,520,709 B1 * | 2/2003 | Mosing | B66C 1/66 403/305 |
| 6,560,955 B1 | 5/2003 | Chia et al. | |
| 6,644,008 B2 | 11/2003 | Rosenwasser et al. | |
| 6,786,032 B2 | 9/2004 | Chia et al. | |
| 7,481,084 B1 * | 1/2009 | Wu | E05B 67/003 70/18 |
| 7,712,339 B2 * | 5/2010 | Hentschel | E05B 37/025 70/30 |
| 8,881,559 B1 * | 11/2014 | Chang | E05B 67/003 70/49 |
| 8,904,831 B2 * | 12/2014 | Stevens | E05B 67/003 70/14 |
| 8,983,957 B2 | 3/2015 | Rathod | |
| 10,766,553 B2 * | 9/2020 | Shenkerman | B62H 5/003 |
| 2003/0150204 A1 | 8/2003 | Rosenwasser et al. | |
| 2003/0213226 A1 * | 11/2003 | Moehnke | F16G 13/12 59/78 |
| 2005/0183475 A1 * | 8/2005 | Liu | E05B 67/003 70/49 |
| 2006/0070370 A1 | 4/2006 | Fahrion | |
| 2011/0154870 A1 * | 6/2011 | Buhl | E05B 7/003 70/233 |
| 2015/0308526 A1 | 10/2015 | Swank et al. | |
| 2016/0222792 A1 | 8/2016 | King | |
| 2016/0281635 A1 | 9/2016 | Weinenger et al. | |
| 2017/0008072 A1 | 1/2017 | Cui et al. | |

FOREIGN PATENT DOCUMENTS

| | | |
|---|---|---|
| EP | 3 150 298 A1 | 4/2017 |
| JP | 3093316 | 2/2003 |

* cited by examiner

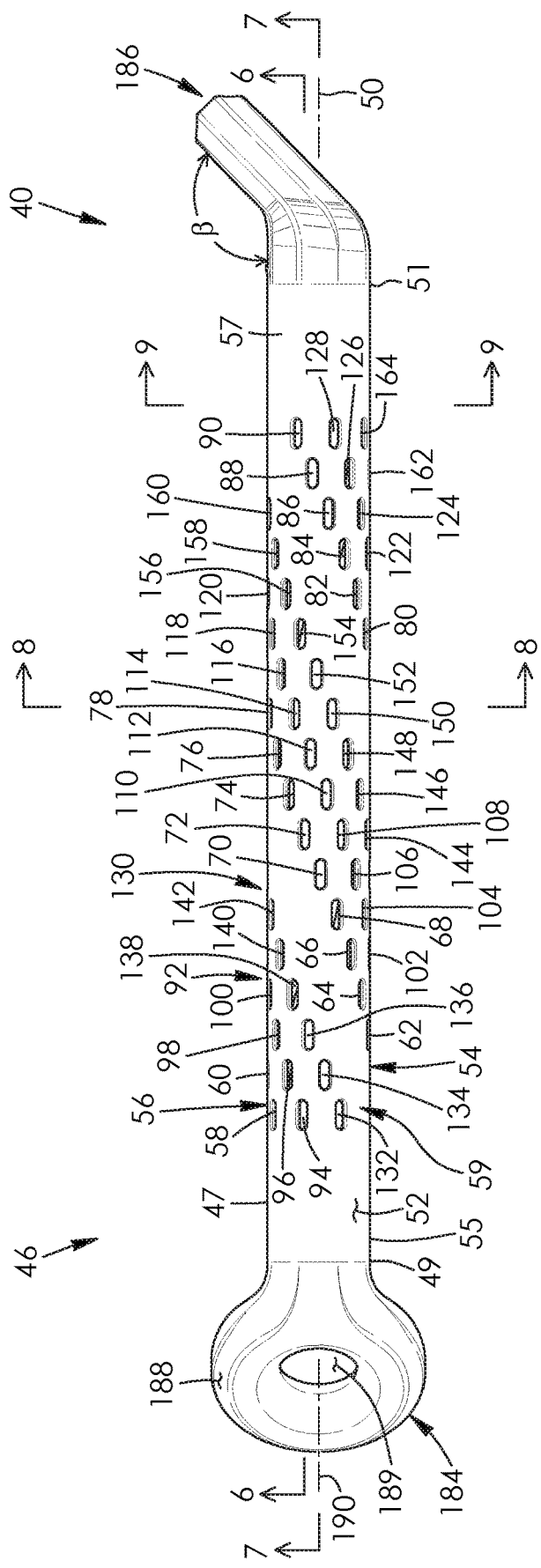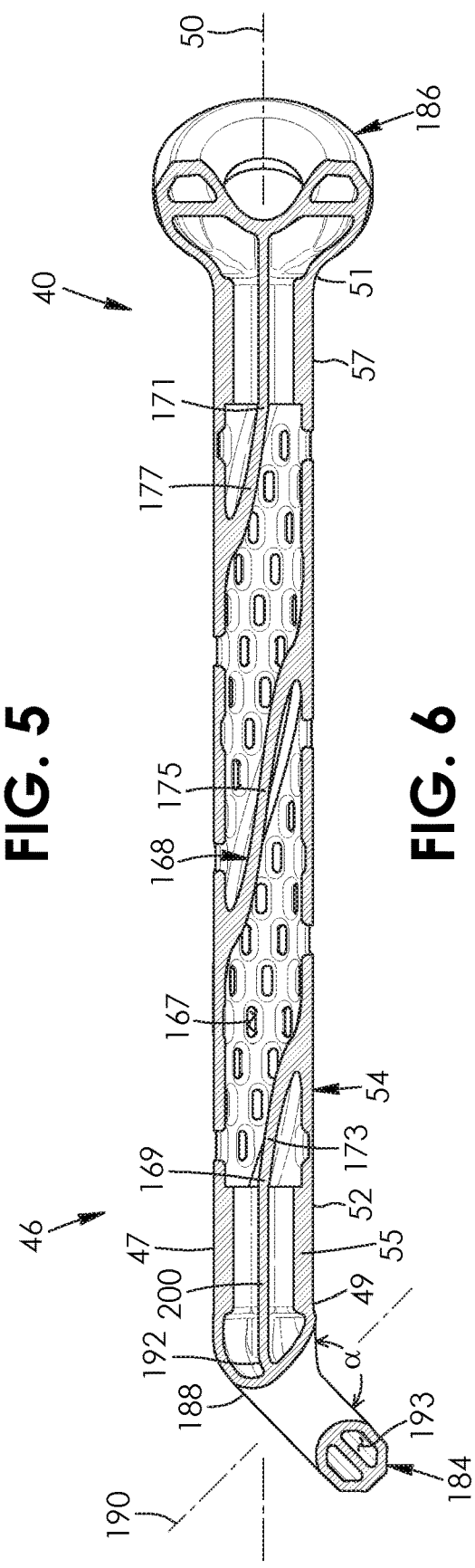
FIG. 5
FIG. 6

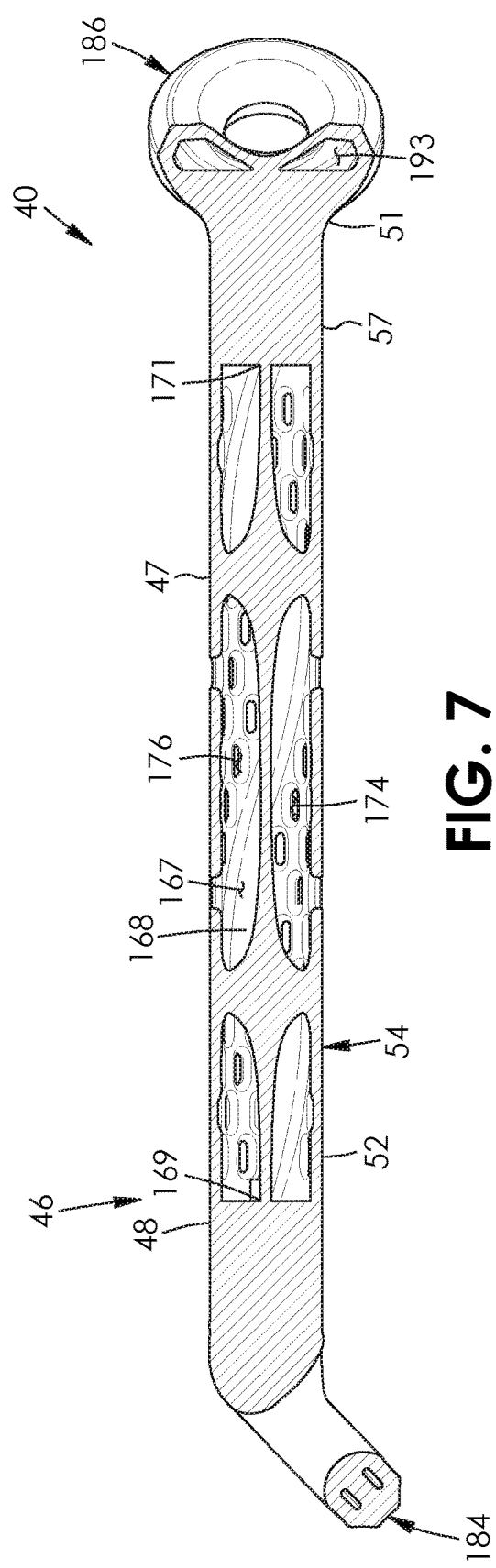
FIG. 7
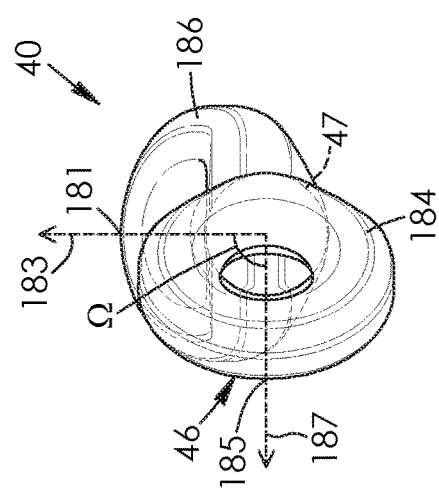
FIG. 9B
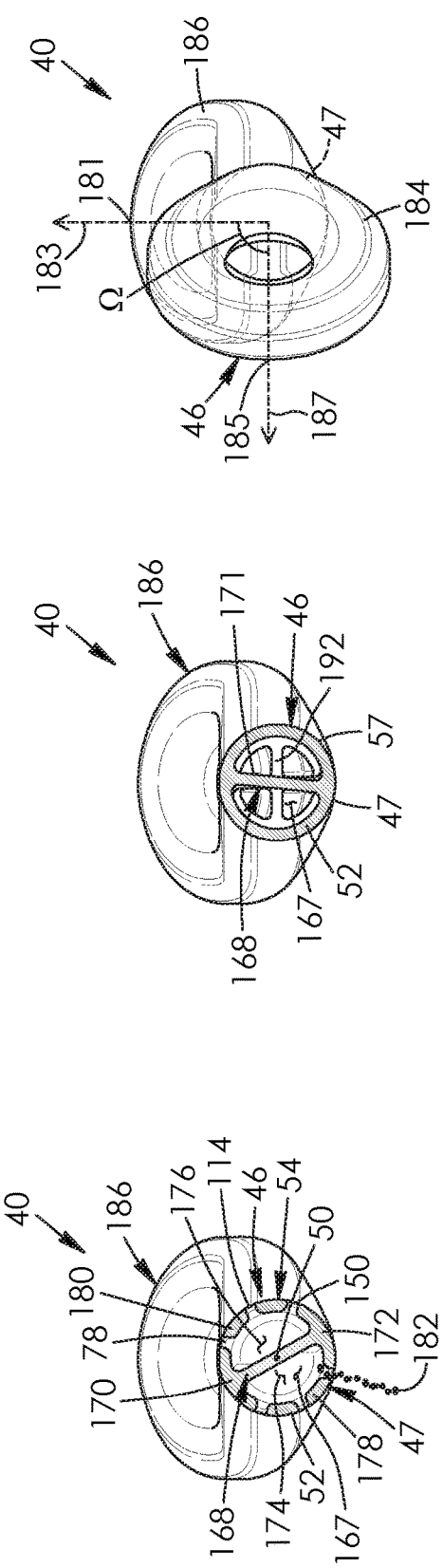
FIG. 9A
FIG. 8

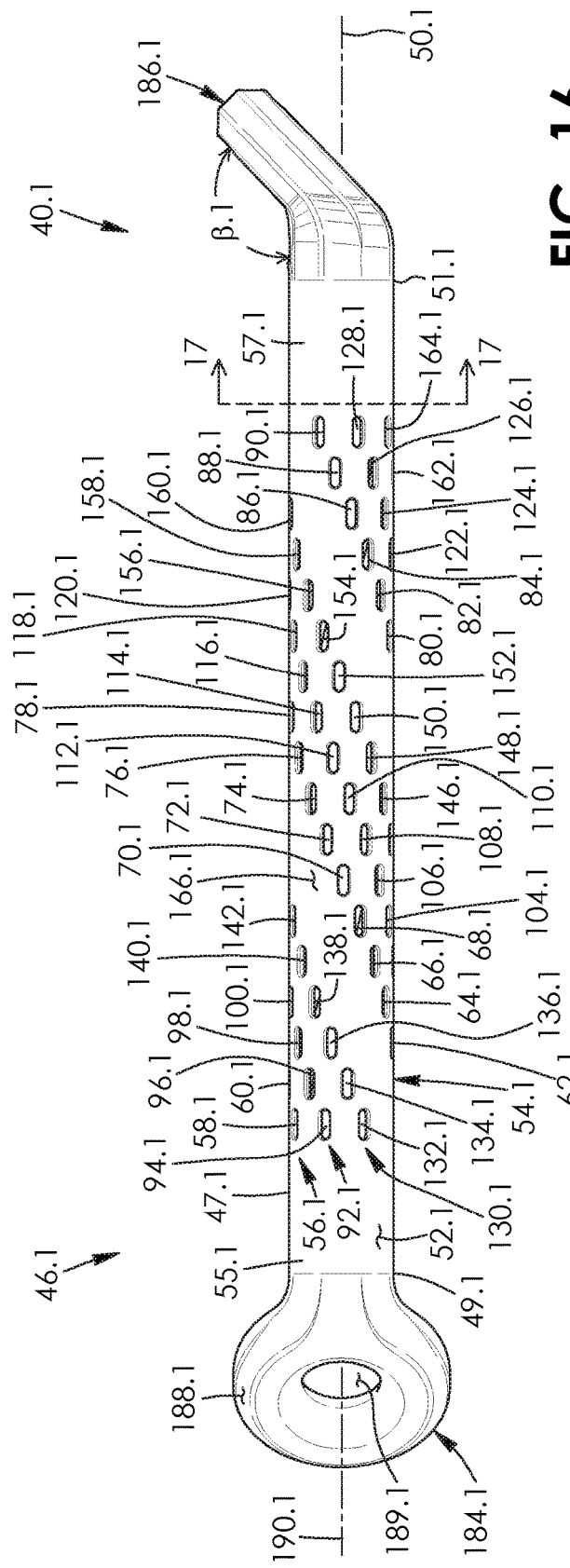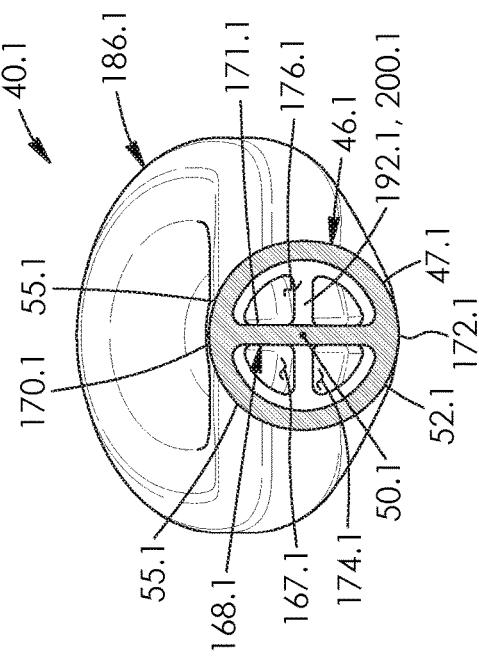

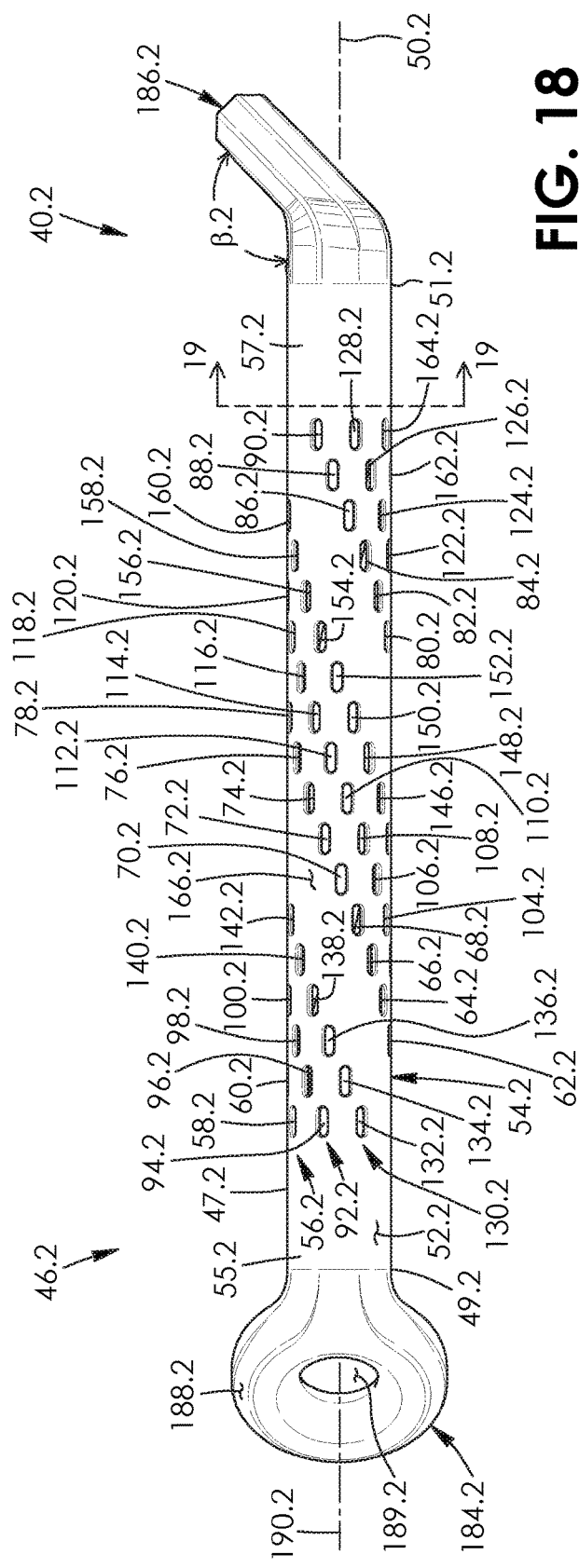
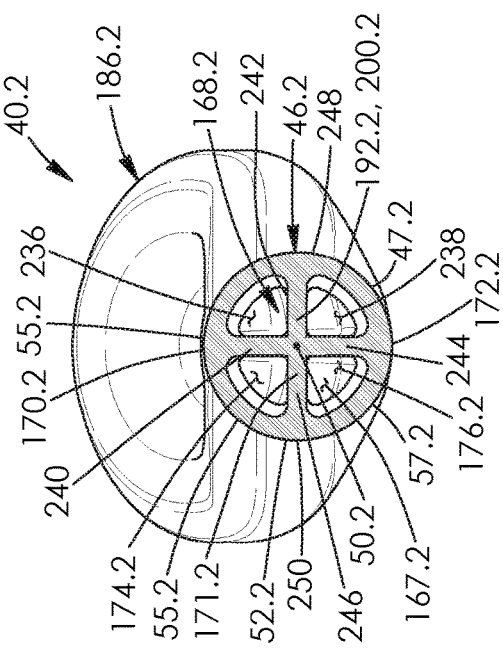
FIG. 18
FIG. 19

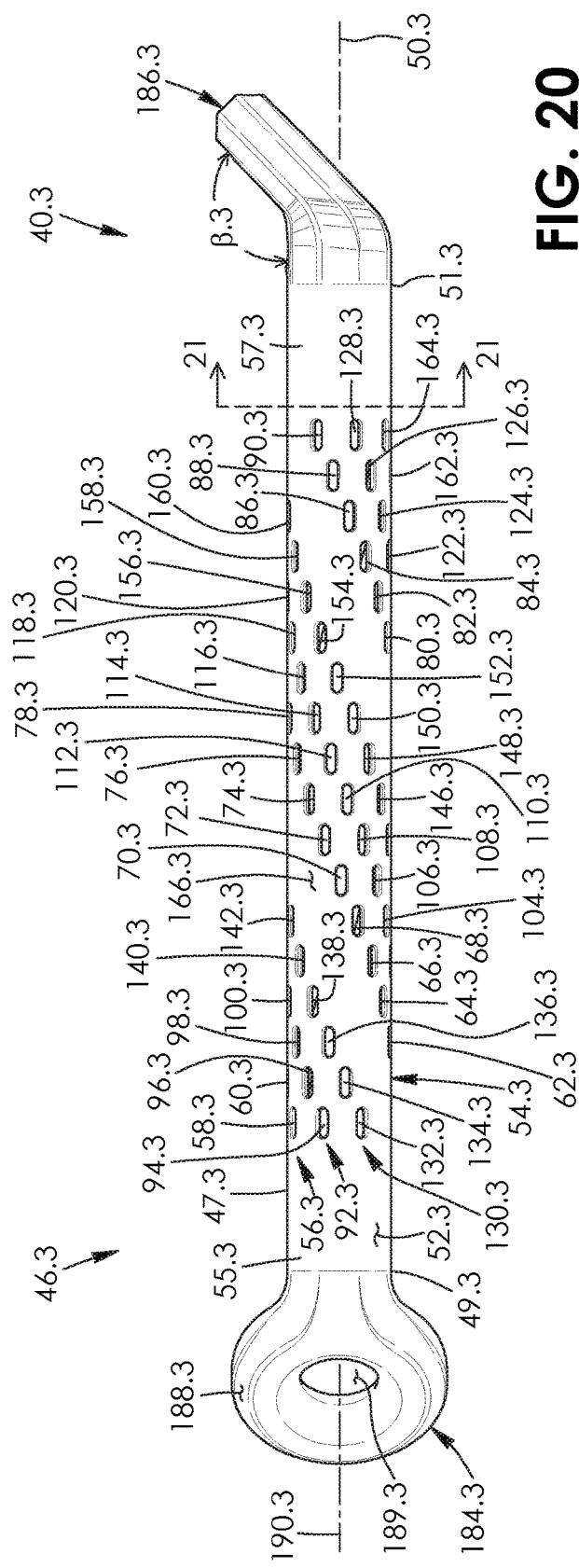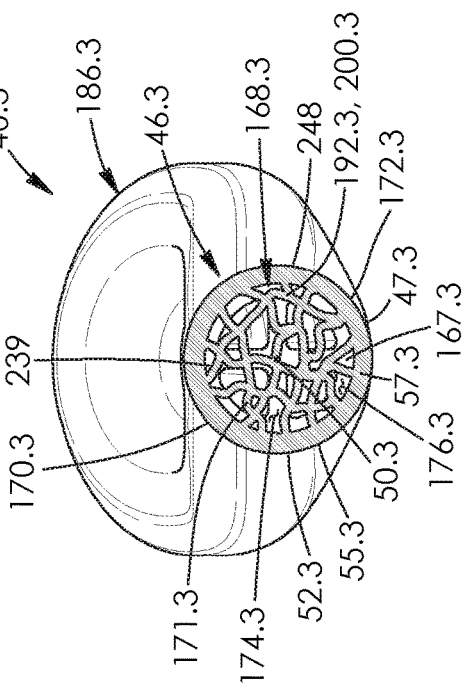
FIG. 20
FIG. 21

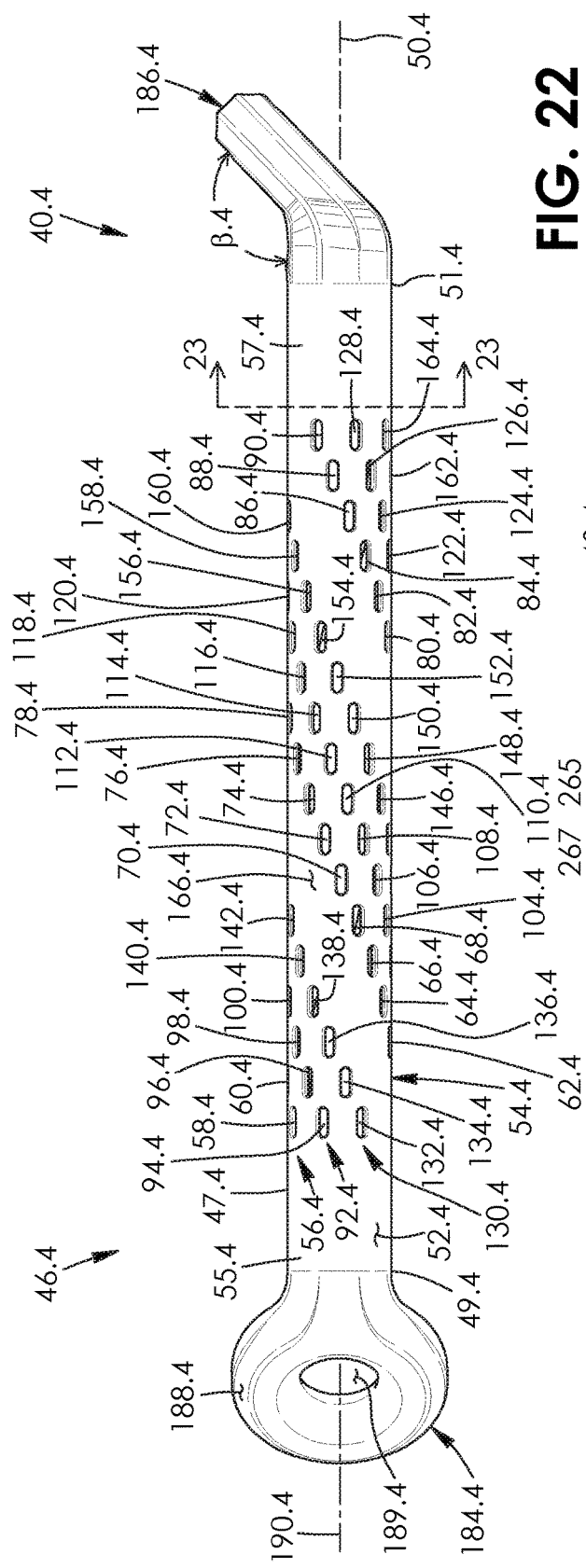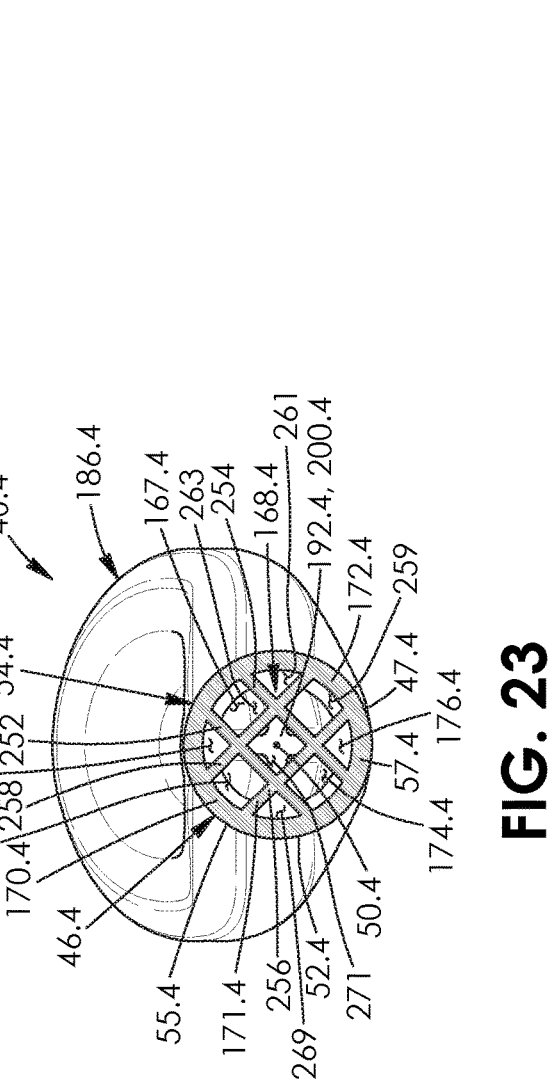
FIG. 22
FIG. 23

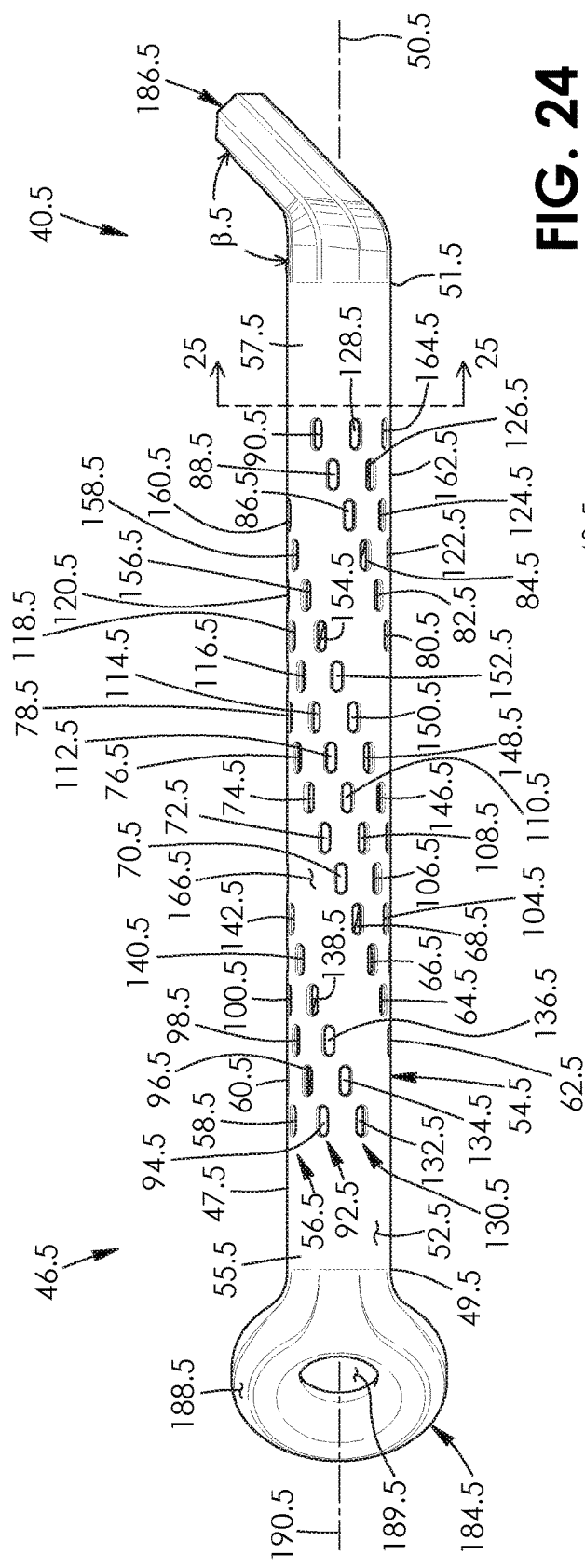
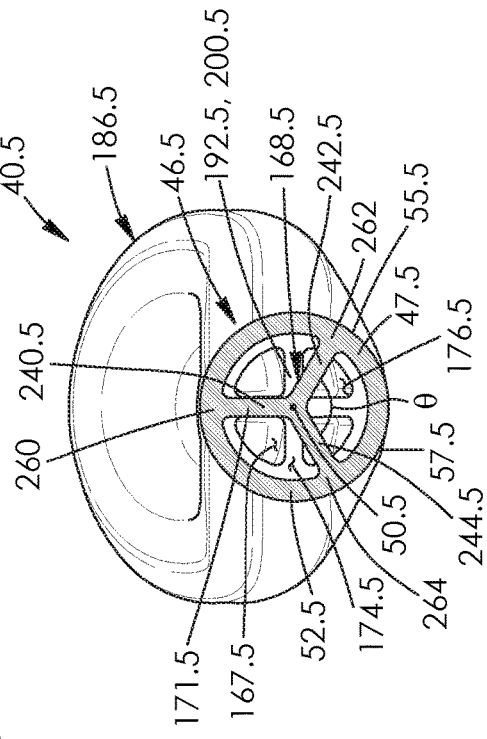
FIG. 24
FIG. 25

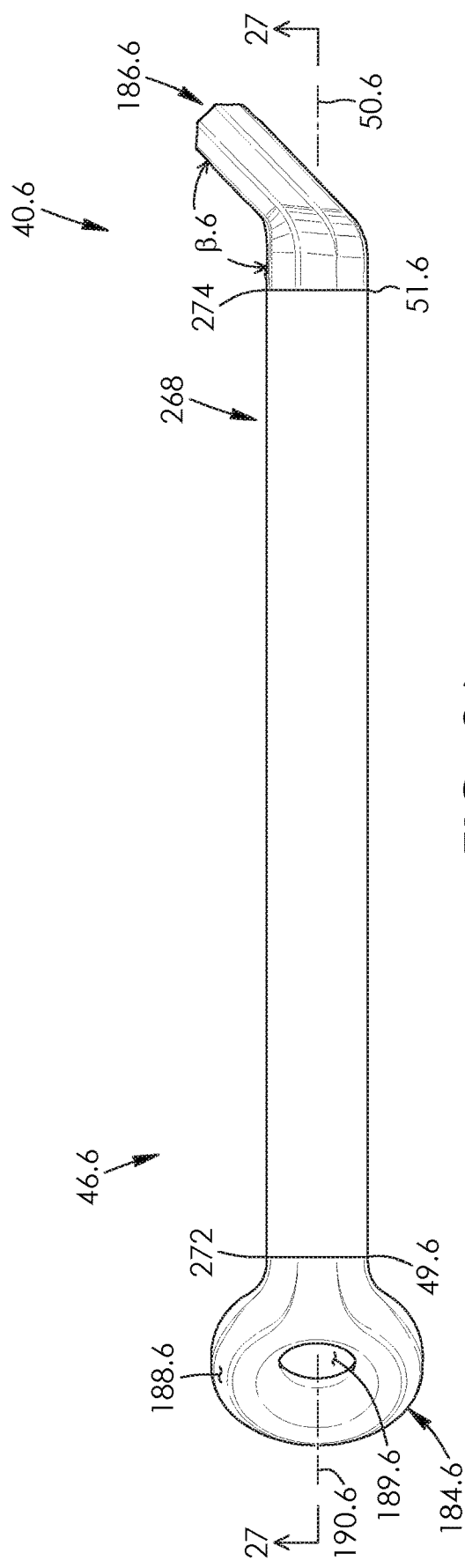
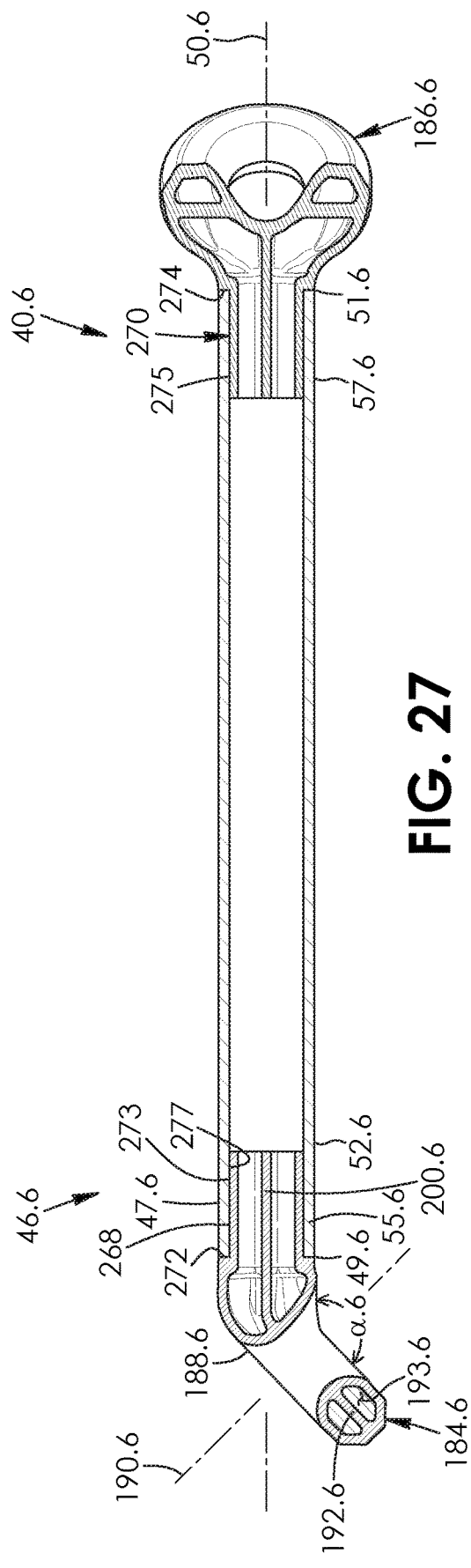
FIG. 26
FIG. 27

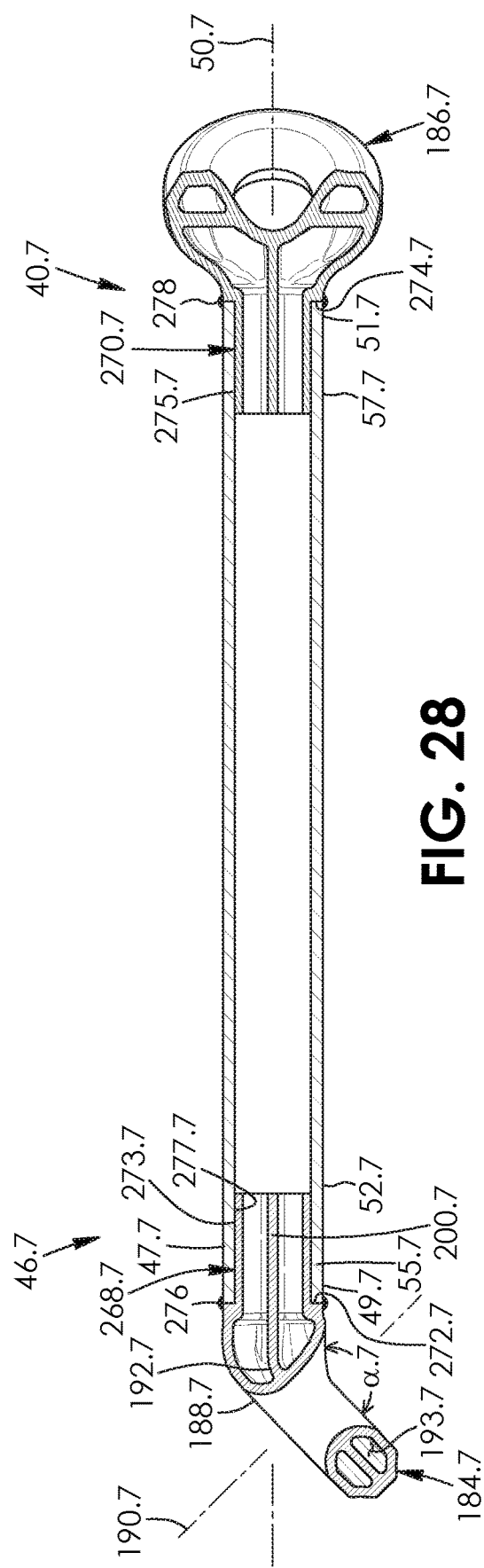
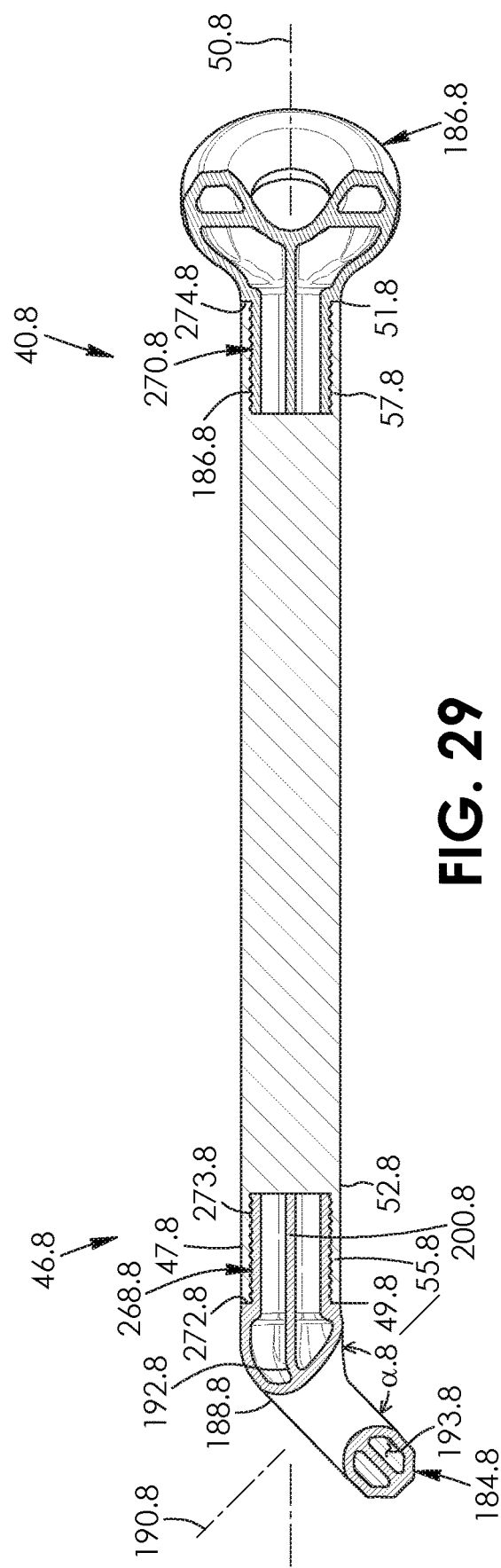
FIG. 28
FIG. 29

CHAIN ASSEMBLY AND A BICYCLE LOCK MANUFACTURED THEREFROM

BACKGROUND OF THE INVENTION

Field of the Invention

There is provided a chain assembly. In particular, there is provided a chain assembly made by additive manufacturing and a bicycle lock manufactured therefrom.

Description of the Related Art

U.S. Pat. No. 925,309 to Dickey discloses a hollow-chain chandelier-support in combination. The combination includes two curved members placed together in parallel planes with the curved portions thereof reversed relative to each other. The combination includes rings placed at right angles to the planes of the curved members. The rings encircle the curved members at the points of intersection of the curved members to secure the latter together.

U.S. Pat. No. 5,537,812 to Rozenwasser discloses a fine jewelry hollow rope chain, chain links for preparing such rope chains and a method of manufacturing the same. The rope chain comprises a plurality of interfitting hollow wire links. Each link defines a circumference. Each link has a wire cross-section defining a hollow base portion of generally uniform wall thickness and at least one reinforcing rib portion joined on the base portion. The rib portion protrudes beyond the base portion along the entire circumference of the link, thereby reinforcing the hollow link against mechanical deformation.

U.S. Pat. No. 6,460,323 to Rozenwasser discloses a chain link of hollow construction and substantially uniform thickness, for intertwining with other chain links to form a jewelry chain. The chain link has a non-annular cross-section throughout the link with the cross-section being symmetric along a centerline plane through the cross-section. The cross-sectional shape of the link preferably has on each side of the centerline plane and at least two sides that meet at a point of inflection. On each side of the centerline plane, at least one side preferably converges toward the centerline plane. A reduction in manufacturing costs and precious metal used to form the links and therefore the chain may be realized by using a non-annular cross-section having such constructional qualities.

U.S. Pat. No. 5,452,572 to Alvaro discloses a rope chain made from hollow rectangular links having a trapezoidal cross section. The wider parallel surface of the trapezoid is the outer periphery of the shaped link and is the primary surface of the finished rope chain. The narrower parallel surface of the trapezoidal shape, having a channel which forms a longitudinal seam running around the inside of the link, is an inside surface of the finished rope chain and is not visible in a finished chain. The other two sides of the trapezoid converge in symmetrical relationship to the parallel surfaces, and include an angle that approximately equals 360° divided by the number of links required to form a single cycle of links in a double helix, as viewed in an end view of the rope chain. Adjacent links abut, planar surface to planar surface, and form a close fitting circle with a smooth external surface for the rope chain.

U.S. Pat. No. 6,560,955 to Chia et al. discloses a decorative rope chain and a manufacturing process to produce a rope chain in which each link element used as a basic building element exhibits a unique visual property, such as surface texture, coloration, attribute, feature, characteristic, shape or other physical appearance. Such unique visual property traits for the succession of link elements results in a more attractive, fanciful, more delicate and interesting fashion item. Each of the interconnected link elements may have a first major surface exhibiting a first visual property and an opposite second major surface exhibiting a second, perceptively different, visual property. In other aspects of the invention, the major surfaces of the link elements may have differently colored or textured surface portions. In yet another aspect of the invention, each link element may have differently shaped portions. Similarly, the interior and/or exterior edges of the link element may exhibit different shapes, colors, patterns, or textures.

BRIEF SUMMARY OF INVENTION

There is provided, and it is an object to provide, an improved chain assembly and method of making the same.

According to one aspect, there is provided a chain apparatus having an exterior. The chain apparatus includes a pair of at least partially hollow enlarged end members, each having a connection aperture extending therethrough. The chain apparatus includes an at least partially hollow elongate member coupled to and extending between the end members. Each said member comprises a plurality of internal chambers in fluid communication with said exterior.

According to another aspect, there is provided a chain apparatus comprising a pair of spaced-apart enlarged end members, each having a connection aperture extending therethrough. The chain apparatus also includes an elongate member coupled to and extending between the end members. The elongate member being hollow at least in part. The chain apparatus includes at least one longitudinally-extending support member positioned within and coupled to the elongate member.

According to a further aspect, there is provided a chain assembly comprising a plurality of the above chain apparatuses. A first said end member of a first said chain apparatus extends through and couples together with a first said end member of a second said chain apparatus. A second said end member of the second said chain apparatus extends through and couples together with a first said end member of a third said end member. A second said end member of the third said chain apparatus extends through and couples together with a first said end member of a fourth said chain apparatus. The chain apparatuses are shaped such that the first said end member of the fourth said chain apparatus is alignable to extend in parallel with the first said end member of the second said chain apparatus, and a second said end member of the first said chain apparatus and a second said end member of the fourth said chain apparatus are abutable and alignable to extend in parallel with each other.

According to another aspect, there is provided a bicycle lock comprising a lock mechanism and the above chain assembly. The locking mechanism is selectively extendable through the second said end member of the first said chain apparatus and the second said end member of the fourth said chain apparatus.

According to yet a further aspect, there is provided a chain apparatus made at least in part by additive manufacturing. The apparatus includes a pair of spaced-apart enlarged end members, each having a connection aperture extending therethrough. The apparatus includes an elongate member coupled to and extending between the end members. At least one of the members comprises one or more self-draining internal chambers to allow for removal of residual, at least partially unsintered, material therefrom.

BRIEF DESCRIPTION OF DRAWINGS

The invention will be more readily understood from the following description of preferred embodiments thereof given, by way of example only, with reference to the accompanying drawings, in which:

FIG. 5 is a right side elevation view of one said chain apparatus of the chain assembly of FIG. 1;

FIG. 6 is a longitudinal sectional view of the chain apparatus of FIG. 5 taken along lines 6-6 of FIG. 5;

FIG. 7 is a longitudinal sectional view of the chain apparatus of FIG. 5 taken along lines 7-7 of FIG. 5;

FIG. 8 is a cross-sectional view of the chain apparatus of FIG. 5 taken along lines 8-8 of FIG. 5;

FIG. 9A is a cross-sectional view of the chain apparatus of FIG. 5 taken along lines 9-9 of FIG. 5;

FIG. 9B is a front side end view of the chain apparatus of FIG. 7;

FIG. 16 is a right side elevation view of a chain apparatus of a chain assembly according to a second aspect;

FIG. 17 is a cross-sectional view of the chain apparatus of FIG. 16 taken along lines 17-17 of FIG. 16;

FIG. 18 is a right side elevation view of a chain apparatus of a chain assembly according to a third aspect;

FIG. 19 is a cross-sectional view of the chain apparatus of FIG. 18 taken along lines 19-19 of FIG. 18;

FIG. 20 is a right side elevation view of a chain apparatus of a chain assembly according to a fourth aspect;

FIG. 21 is a cross-sectional view of the chain apparatus of FIG. 20 taken along lines 21-21 of FIG. 20;

FIG. 22 is a right side elevation view of a chain apparatus of a chain assembly according to a fifth aspect;

FIG. 23 is a cross-sectional view of the chain apparatus of FIG. 22 taken along lines 23-23 of FIG. 22;

FIG. 24 is a right side elevation view of a chain apparatus of a chain assembly according to a sixth aspect;

FIG. 25 is a cross-sectional view of the chain apparatus of FIG. 24 taken along lines 25-25 of FIG. 24;

FIG. 26 is a right side elevation view of a chain apparatus of a chain assembly according to a seventh aspect;

FIG. 27 is a cross-sectional view of the chain apparatus of FIG. 26 taken along lines 27-27 of FIG. 26;

FIG. 28 is a cross-sectional view similar to FIG. 27 of a chain apparatus of an assembly according to an eighth aspect; and FIG. 29 is a cross-sectional view similar to FIG. 27 of a chain apparatus of an assembly according to an eighth aspect.

DESCRIPTION OF THE PREFERRED EMBODIMENTS

Figure 1:
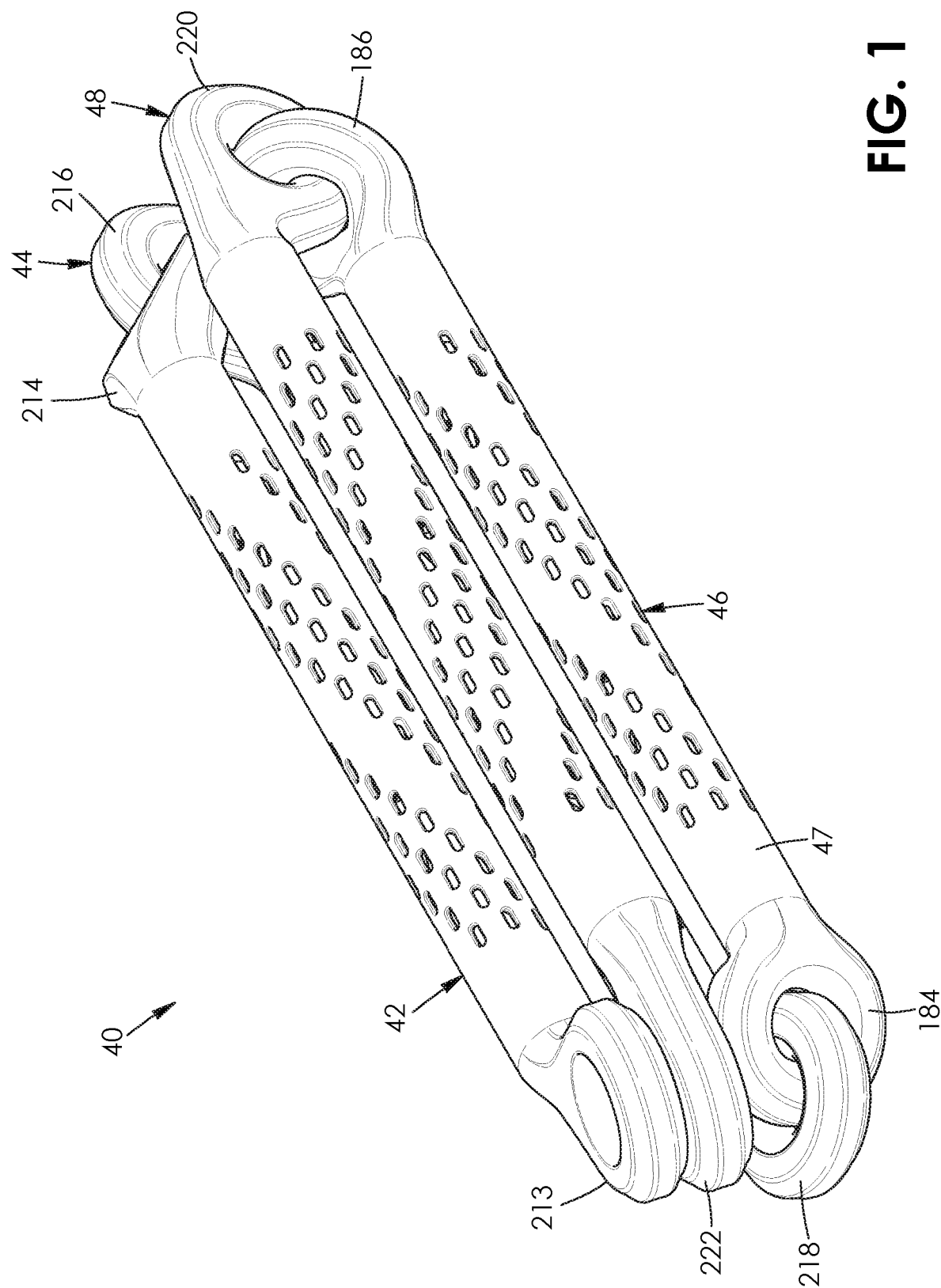
FIG. 1 is a top, right side, front perspective view of a chain assembly according to a first aspect, the chain assembly comprising a plurality of chain apparatuses.
Figure 2:
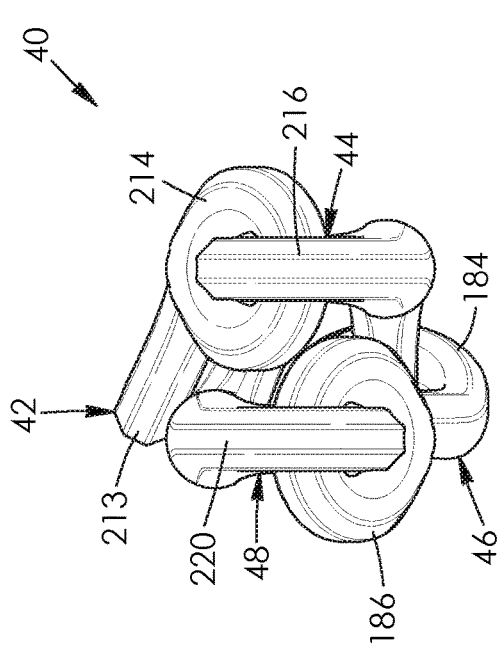
FIG. 2 is a front end elevation view thereof.
Figure 3:
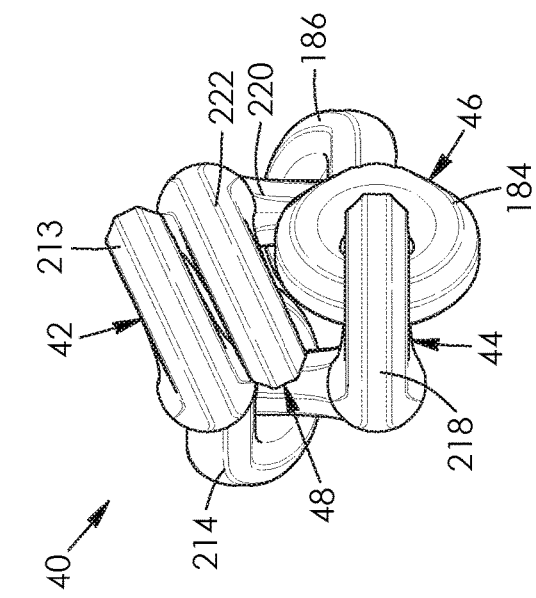
FIG. 3 is a rear end elevation view thereof.
Figure 4:
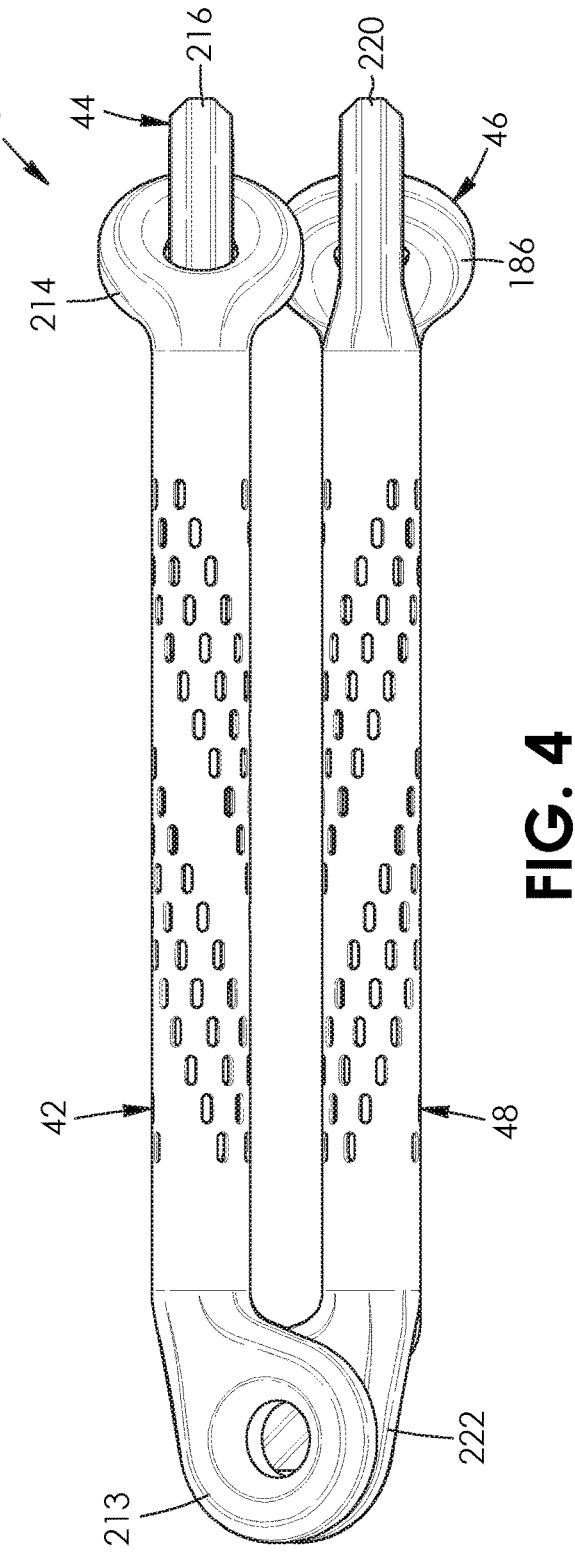
FIG. 4 is a top plan view thereof.
Figure 10:
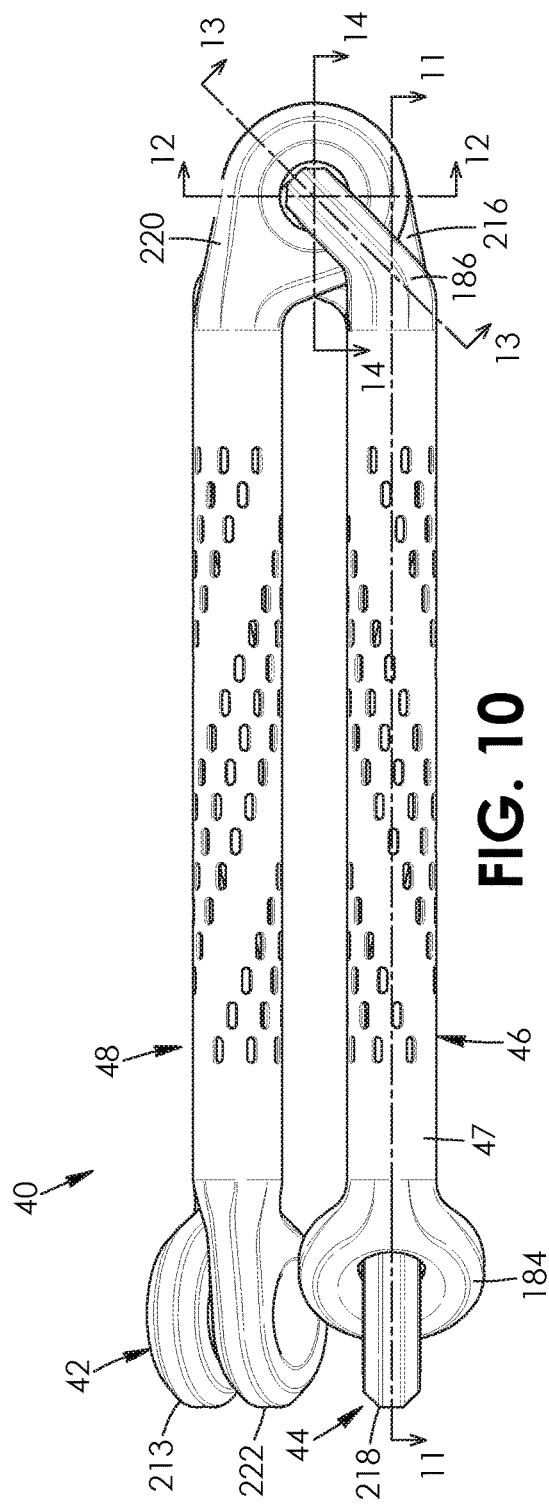
FIG. 10 is a right side elevation view of the chain assembly of FIG. 1.
Figure 11:
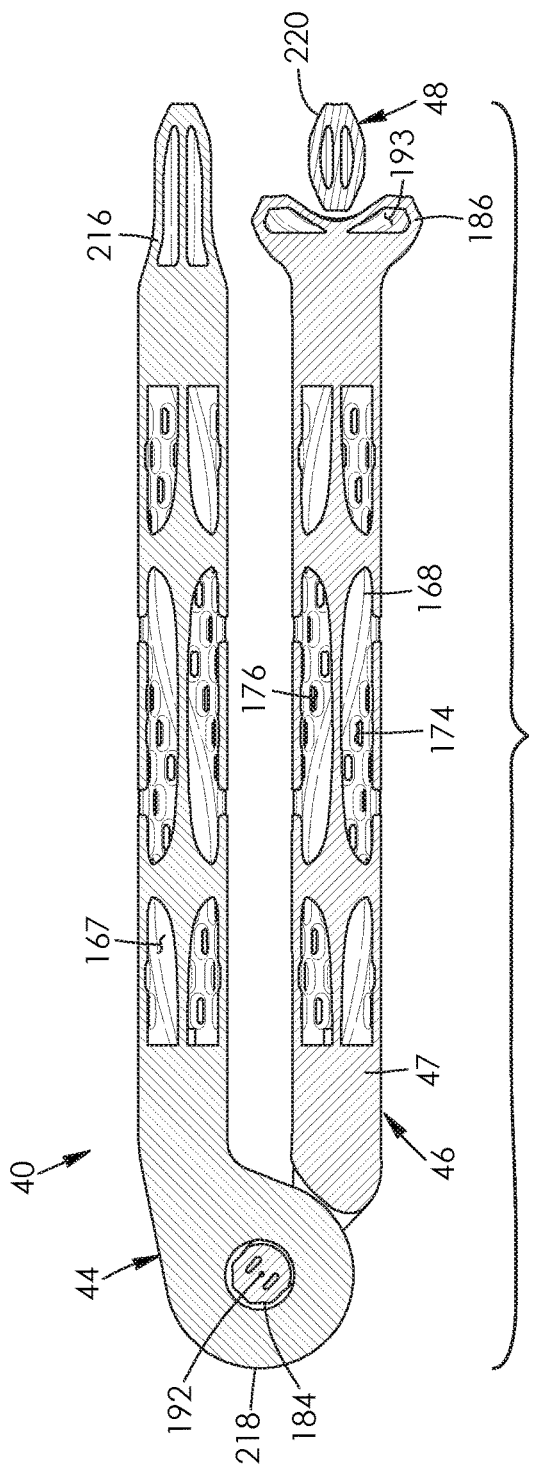
FIG. 11 is a longitudinal sectional view of the chain assembly of FIG. 10 taken along lines 11-11 of FIG. 10.

Referring to the drawings and first to FIG. 1, there is provided a chain assembly 40. The chain assembly as herein described comprises 3D-printed internal matrices or elongate support structures, in this example a plurality of chain apparatuses including: a first chain apparatus 42, a second chain apparatus 44, a third chain apparatus 46, and a fourth chain apparatus 48. However, this number of chain apparatus is not strictly required: the number of chain apparatus in the assembly may be as a little two in another embodiment, or six or more in other embodiments, for example.

Each chain apparatus 42, 44, 46 and 48 is made by an additive manufacturing process resulting in an intrinsically sealed, continuous metallic assembly, including enlarged end members, in this example annular members 184 and 186 permanently joined via passing link eyelet joints as further described below. The use of an additive manufacturing process allows the chain assembly 40 to be produced in its entirety without the need for welded, press-fit, bonding or other methods of affixing adjacent seams, and may thereby be without mechanical weaknesses intrinsic to these methods.

Additive manufacturing is a known method which is one of several known methods of making a three-dimensional object via the addition of layer by layer of material such as metal, composites or the like. Typically, a computer model or drawing of the product is first created in the form of a CAD drawing file, for example. Thereafter, additive manufacturing equipment processes the data from the file, and "prints" or adds successive layers of liquid, metal powder embedded in a binder material, metal wire, nano-particles, sheet material or other base materials, layer-upon-layer, to fabricate the desired object. The types of additive manufacturing technologies that may be used for fabricating the assembly 40 as herein described include, but are not limited to, direct metal laser sintering (DMLS), selective laser melting (SML), electron-beam (EBM), arc/plasma, material jetting, material extrusion, binder jetting, cold spray, friction welding, sheet lamination, fused deposition modeling (FDM), atomic diffusion, bound metal deposition, and single-pass jetting, for example.

The assembly 40 as herein described may be made of common stainless steels, different grades of titanium, or other alloys that can be 3D printed, and/or composites including those reinforced with carbon fibre, synthetic fiber of high tensile strength such as Kevlar®, or other strengthening materials, for example.

Each chain apparatus 42 to 46 is of equal length in this example; however, here too this is not strictly required and two half-length chain apparatuses may take the place of a full length chain apparatus shown in FIG. 1 in other embodiments, for example. Such variations may enable the assembly 40 to be more or less chain-like.

Referring to FIG. 1, each chain apparatus 42 to 46, as shown for chain apparatus 46, includes a partially hollow elongate member 47 that is tubular in this example. However, the elongate member may have different shapes in other embodiments, including having a lateral cross-section that is square, rectangular, diamond-shaped, hexagonal or irregular shaped, for example. As seen in FIG. 5, each elongate member 47 has a longitudinal axis 50. Each elongate member has a pair of spaced-apart ends 49 and 51. Each elongate member includes an outer tubular wall 52 that extends along the longitudinal axis 50 thereof. The wall extends between ends 49 and 51 of the elongate member. Each elongate member 47 has an elongate, cylindrical exterior 54 along which the outer wall extends.

Referring to FIG. 6, the elongate member includes in this example a first sleeve-shaped end portion 55 which extends from end 49 part way towards end 51 thereof in this example. The elongate member 47 includes a second sleeve-shaped end portion 57 which extends from end 51 part way towards end 49 thereof in this example.

As seen in FIG. 5, each elongate member 47 has a plurality of circumferentially spaced-apart, apertures extending through the wall 52 thereof, with the apertures being helically arranged in this example. In this case, each elongate member includes a first array 56 of helically arranged apertures 58, 60, 62, 64, 66, 68, 70, 72, 74, 76, 78, 80, 82, 84, 86, 88 and 90, a second array 92 of helically arranged apertures 94, 96, 98, 100, 102, 104, 106, 108, 110, 112, 114, 116, 118, 120, 122, 124, 126 and 128, and a third array 130 of apertures 132, 134, 136, 138, 140, 142, 144, 146, 148, 150, 152, 154, 156, 158, 160, 162 and 164. The apertures are helically arranged relative to longitudinal axis 50. Each aperture has an obround shape in this example. Second array 92 of apertures is adjacent to first array 56 of apertures and third array 130 of apertures. First array 56 of apertures is spaced-apart from third array 130 of apertures, with a helical portion 166 of the wall 52 being positioned therebetween. The helical portion of the wall is spaced-apart from the second array 92 of apertures. As seen in FIG. 5, the arrays 56, 92 and 130 extend around the outer wall 52 of the elongate member 47 twice in this example; however, this is not strictly required and the helical pattern of apertures may comprise more or fewer spiral arrangements in other embodiments. The elongate member in this embodiment comprises rows of three adjacent apertures, as shown by row 59 of adjacent apertures 132, 94, and 58, arranged in three spirals.

As a further alternative, the apertures need not be in a spiral arrangement. They may be diamond shaped and/or in a web-like array in other embodiments, for example.

As seen in FIG. 6, each chain apparatus 46 includes a longitudinally-extending internal support member, in this example a helical support member 168. The helical support member is positioned within the interior 167 of the elongate member 47 and couples to the elongate member. The support member 168 is helical in shape, extends along the longitudinal axis 50, extends about the longitudinal axis 50 of the elongate member three times in this example and forms three elongate spiral-shaped subportions 173, 175 and 177 in this example. The support member extends between the end portions of the elongate member 47 in this example, with ends 169 and 171 of the helical support member aligning with and being adjacent to end portions 55 and 57, respectively. As seen in FIG. 8, the helical support member 168 extends between and couples to opposed portions 170 and 172 of the outer wall 52 of the elongate member. The helical support member couples to and integrally connects with the elongate member 47 thereby and thus forms a unitary whole therewith in this example.

As seen in FIG. 8, each elongate member 47 has a plurality of adjacent chambers, in this example a pair of chambers 174 and 176 disposed within the interior 167 of thereof. Chamber 174 is defined in this example by the helical support member 168 and a portion of wall 52, in this case a spiral-shaped portion 178 of the wall that is arc-shaped in lateral cross-section. The spiral-shaped portion extends in a spiral pattern around axis longitudinal axis 50. Chamber 176 is defined in this example by the helical support member and a spiral-shaped portion 180 of the wall that is arc-shaped in lateral cross-section in this example. Each chamber extends within the interior 167 of the elongate member 47 three times in this example about longitudinal axis 50, is spiral-shaped and is semi-circular in lateral cross-section in this embodiment.

The elongate member 47 has at least one, and in this example a plurality of apertures extending through wall 52 so as to be in communication with respective chambers, as shown in FIG. 8 by apertures 78, 114 and 150 for chamber 176. Each chamber thus includes at least one aperture extending therethrough to the exterior 54 of the elongate member and each chamber is thus in fluid communication with the exterior of the elongate member in this example. As seen in FIG. 8, the apertures are shaped to facilitate removal of residual, at least partially unsintered, material and/or non-permanent support material therefrom, as shown by material of numeral 182. Each elongate member 47 thus includes one or more hollow chambers 174 and 176 that are self-draining. The voids/chambers of the chain apparatuses 46 as herein described are arranged to allow drainage of unused/unsintered material from the additive manufacturing process.

As seen in FIG. 5, each chain apparatus includes a pair of spaced-apart, partially hollow enlarged end members, in this example loop-shaped or annular members, in this case toroidal members 184 and 186. Each toroidal member includes an outer wall 188 that is generally toroidal in shape in this example. The wall extends about a connection aperture 189 which in this example is circular. Each toroidal member may thus be said to comprise an enlarged end member having a connection aperture extending therethrough.

Referring to FIG. 6, toroidal member 184 couples to and extends outwards from end portion 55 of elongate member 47 at an obtuse angle α relative to the longitudinal axis 50 of elongate member 47 in this example. Angle α is equal to 130 degrees in this example; however this is not strictly required and angle α may be different in other embodiments. The toroidal member couples to and integrally connects with the end portion so as to form a unitary whole in this example. As seen in FIG. 5, toroidal member 186 couples to and extends outwards from end portion 57 of the elongate member at an obtuse angle θ relative to the longitudinal axis of the elongate member. The toroidal member couples to and integrally connects with the end portion so as to form a unitary whole in this example. In this example the absolute value of angle α is equal to the absolute value of angle β. Toroidal member 184 extends outwards from the elongate member 47 at a location angularly/circumferentially spaced-apart from toroidal member 186. As seen in FIG. 9B, toroidal member 186 extends radially outwards relative to and from elongate member 47 to a distal end 181 of the toroidal member in a first direction 183. Toroidal member 184 extends radially outwards relative to and from the elongate member to a distal end 185 of the toroidal member in a second direction 187. The second direction is angularly spaced-apart by an angle Ω relative to first direction 183. Angle Ω is approximately equal to 90 degrees in this example. Thus, toroidal member 186 is angularly spaced-apart by 90 degrees from the toroidal member 184 in this example.

Figure 14:
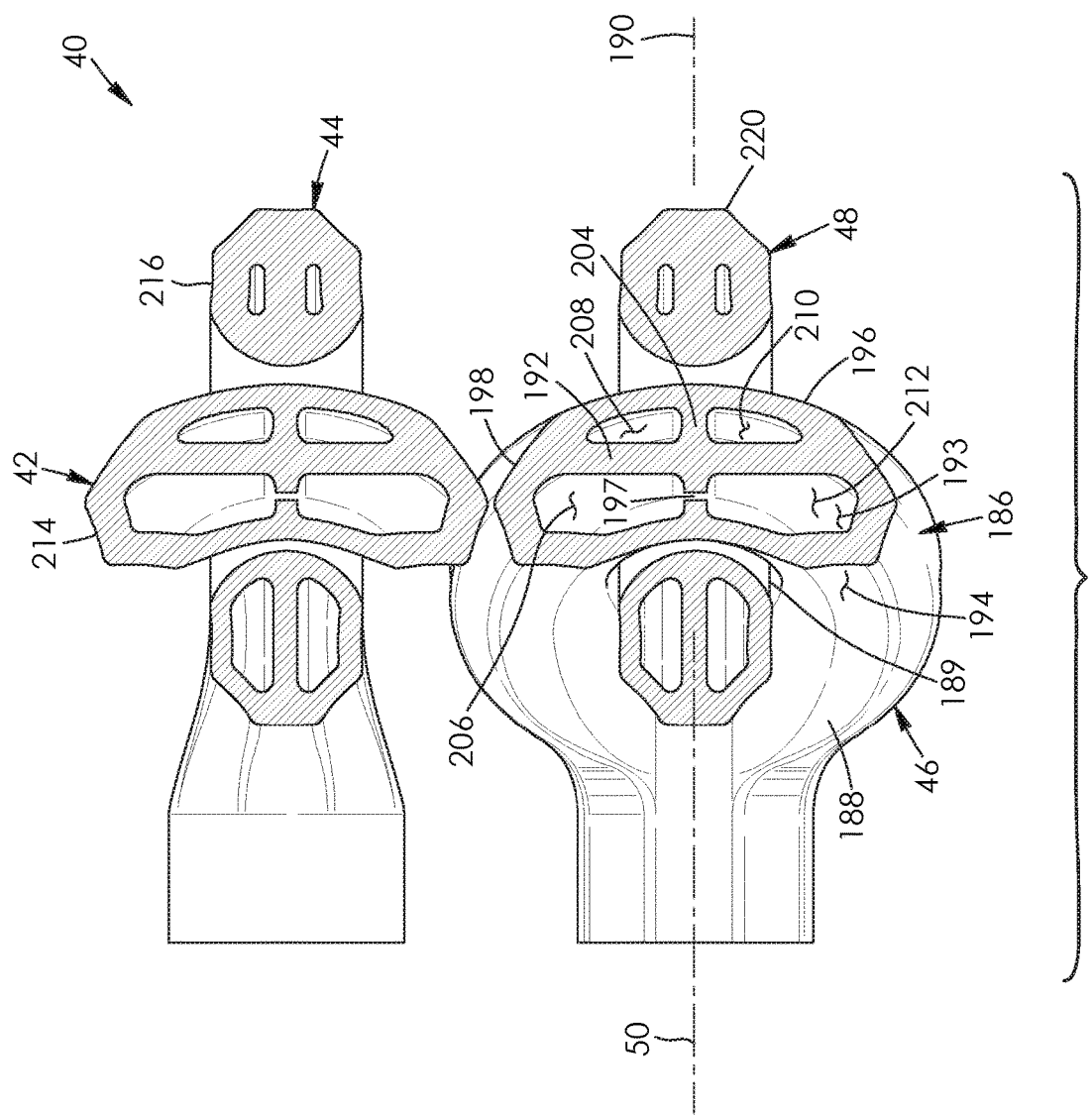
FIG. 14 is a sectional view of the chain assembly of FIG. 10 taken along lines 14-14 of FIG. 10.

As seen in FIG. 6, each toroidal member 184 has an axis 190 about which the annular wall 188 extends. Referring to FIG. 5, connection aperture 189 aligns with and extends radially outwards from the axis. As seen in FIG. 14, the outer wall 188 of each toroidal member 186 includes opposed annular portions 194 and 196 which extend about and generally extend radially outwardly in a perpendicular direction relative to axis 190 of the toroidal member. Each outer wall includes a circumferentially-extending portion 198 which extends along axis 190 in part. The circumferentially-extending portion of the wall 188 extends between, couples to, and integrally connects with opposed annular portions 194 and 196 of the wall in this example so as to form a unitary whole.

Still referring to FIG. 14, each toroidal member 186 includes an annular support member 192 positioned within the interior 193 thereof. Each annular support member is planar in this example and extends about member 186 circumferentially and is radially outwardly-extending relative to axis 190 of its toroidal member. Each annular support member 192 is positioned between opposed annular portions 194 and 196 of its wall 188 in this example. Each annular support member extends between, is contiguous with, couples to and integrally connects with the circumferentially-extending portion 198 of the wall of its toroidal member 186 so as to form a unitary whole.

As seen in FIG. 6, each end portion 55 includes an internal planar support member 200. The support member is generally a rectangular prism in shape in this example and extends along the longitudinal axis 50 of the elongate member 47. The planar support member 200 extends between, couples to, and integrally connects with helical support member 168 and corresponding annular support member 192 of adjacent toroidal member 184 so as to form a unitary whole.

Figure 13:
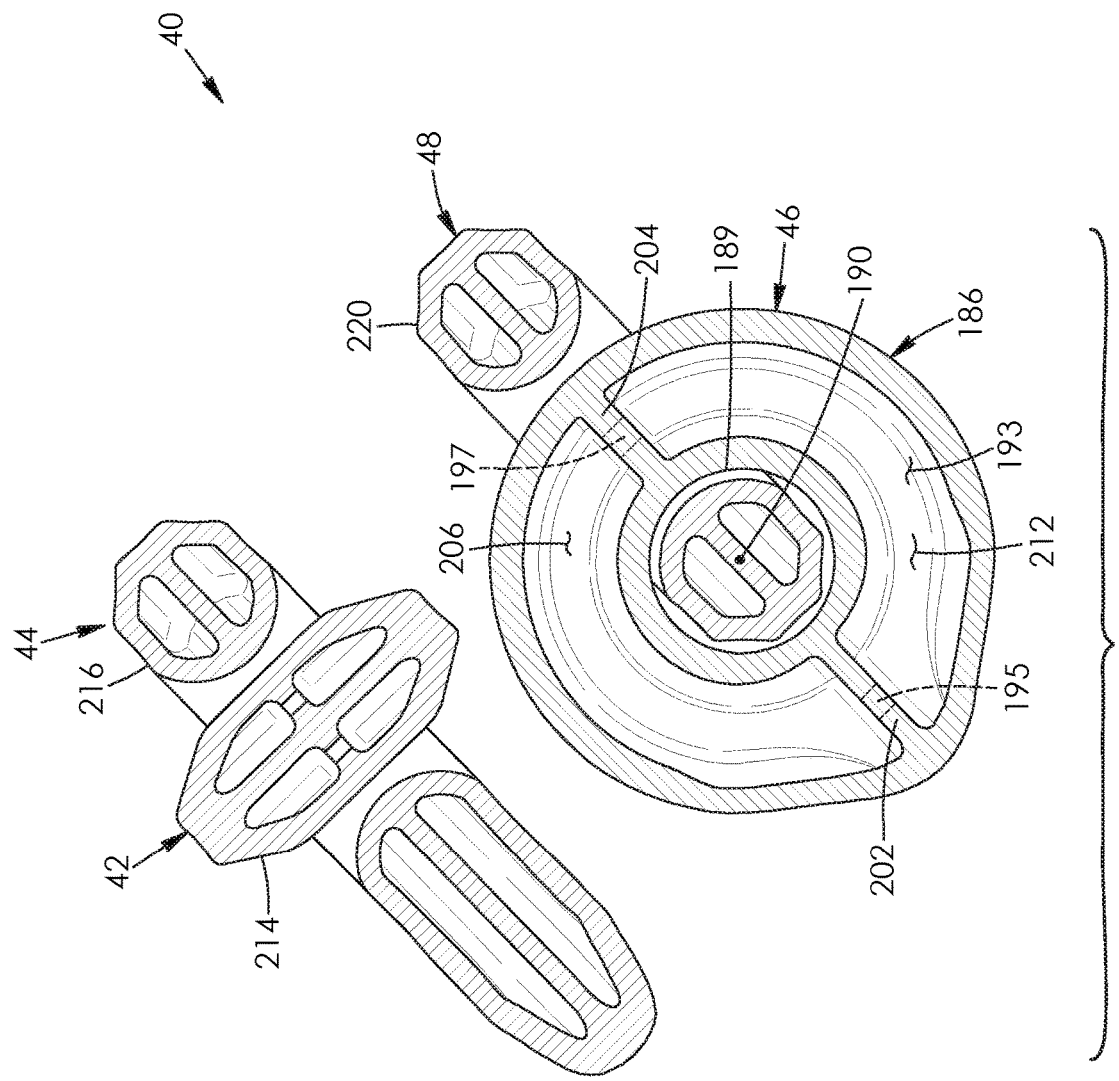
FIG. 13 is a cross-sectional view of the chain assembly of FIG. 10 taken along lines 13-13 of FIG. 10.

Referring to FIG. 13, each toroidal member 186 includes at least one radial support member positioned within the interior 193 thereof, in this example in the form of a pair of braces 202 and 204. Each of the braces is a rectangular prism in shape in this example. The braces 202 and 204 align with and extend radially outwards from axis 190 in this example. As seen in FIG. 14, each of the braces 204 aligns parallel with longitudinal axis 50 of the elongate member 47 in this example. Still referring to FIG. 14, each of the braces 204 also extend in part parallel with axis 190 in this example. The annular support member 192 and braces 204 together comprise an inner support structure that is cruciform or cross-shaped.

Figure 12:
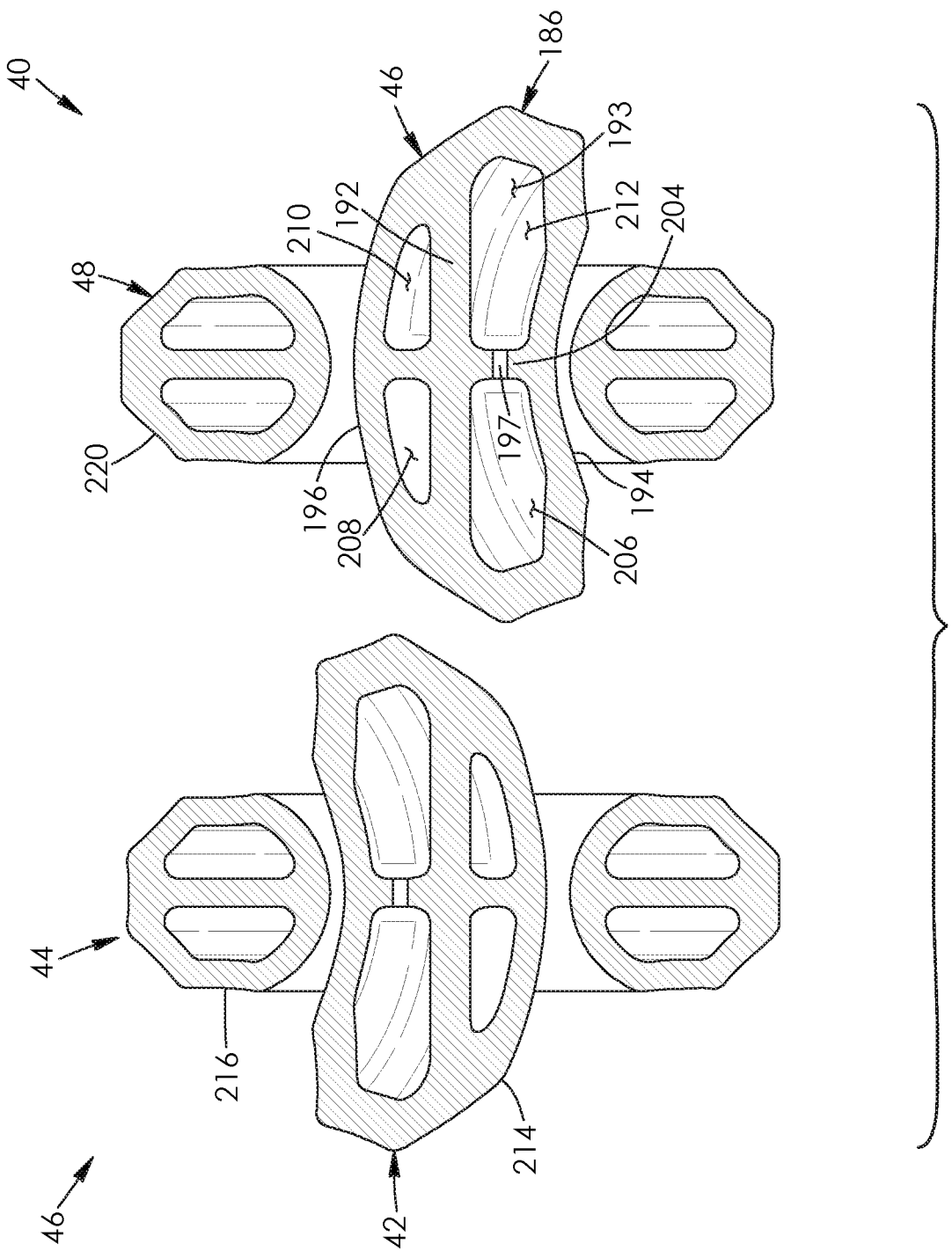
FIG. 12 is a cross-sectional view of the chain assembly of FIG. 10 taken along lines 12-12 of FIG. 10.

Each brace extends between, couples to and integrally connects with opposed annular portions 194 and 196 of wall 188 in this example so as to form a unitary whole. Each brace 204 couples to and integrally connects with annular support member 192 so as to form a unitary whole and so as to form four chambers 206, 208, 210 and 212 within each toroidal member 186 in this example. As seen in FIG. 13, each of the chambers 206 and 212 is arc-shaped in planar cross-section. Each of the chambers extends radially outwards relative to axis 190 and extends circumferentially about axis 190 and connection aperture 189. Referring to FIGS. 12 and 13, apertures extend through the braces in this example such that chambers 206 and 212 are in fluid communication with each other and chambers 208 and 210 are in fluid communication with each other. This is shown in FIGS. 12 and 13 by apertures 195 and 197 extending through braces 202 and 204 so as to enable chambers 206 and 212 to be in fluid communication with each other.

As seen in FIG. 1, toroidal member 214 of first chain apparatus 42 extends through the connection aperture of a first toroidal member 216 of second chain apparatus 44 and couples together with the first toroidal member of the second chain apparatus in the manner of links of a chain. A second toroidal member 218 of the second chain apparatus extends through the connection aperture of toroidal member 184 of third chain apparatus 46 and couples together with toroidal member 184 of the third chain apparatus. Toroidal member 186 of the third chain apparatus extends through the connection aperture of a first toroidal member 220 of fourth chain apparatus 48 and couples together with the first toroidal member of the fourth chain apparatus. The chain apparatuses are shaped such that the first toroidal member 220 of the fourth chain apparatus is alignable to extend parallel to the first toroidal member 216 of the second chain apparatus 44. A second toroidal member 213 of the first chain apparatus 42 and a second toroidal member 222 of the fourth chain apparatus 48 are abutable and alignable to extend parallel with each other in this example.

Figure 15:
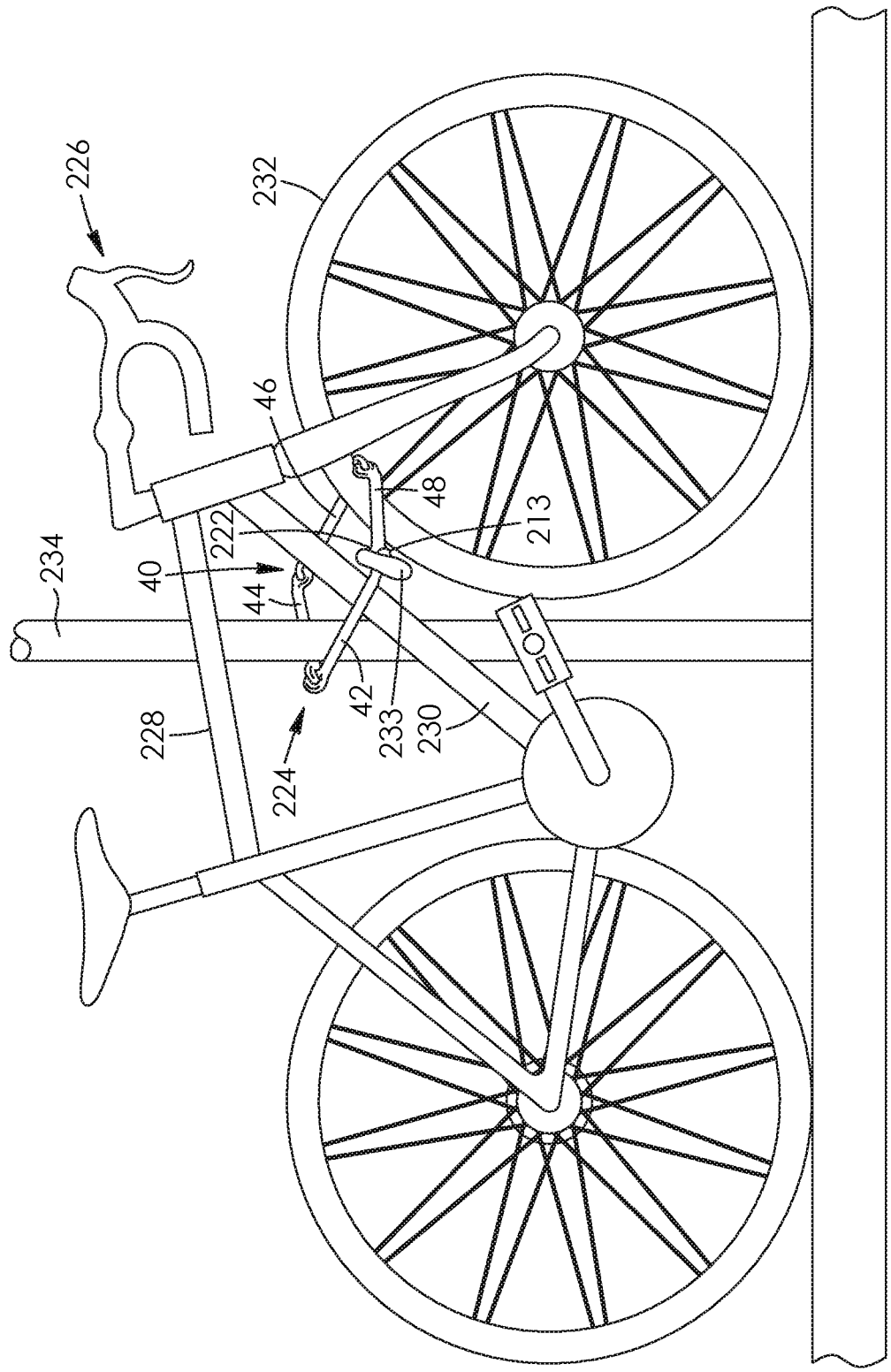
FIG. 15 is a side elevation view of a bicycle and a bicycle lock, the bicycle lock being shown extending about a front wheel and down tube of the bicycle and locking the bicycle to a post, with the bicycle lock comprising the chain assembly of FIG. 1 and a lock mechanism coupling together the chain assembly.

Referring to FIG. 15, the chain assembly 40 in this example is a part of a bicycle lock 224 for a bicycle 226. The bicycle includes a bicycle frame 228 with a down tube 230 and includes a front wheel 232. The bicycle lock 224 includes a lock mechanism, in this example in the form of a padlock 233. Bicycles and padlocks per se, including their various parts and functions, are well known to those skilled in the art and thus will not be described in greater detail.

The bicycle lock 224 is shown with its chain assembly 40 extending through the front wheel 232 of the bicycle 226, about a street post 234, and about down tube 230 of the bicycle such that second toroidal member 213 of first chain apparatus 42 and second toroidal member 222 of fourth chain apparatus 48 align. The padlock 233 is selectively extendable through the connection aperture of the second toroidal member of the first chain apparatus and the second toroidal member of the fourth chain apparatus 48 thereafter, locking the bicycle 226 to the post 234.

FIGS. 16 to 17 show a chain apparatus 46.1 for a chain assembly 40.1 according to a second aspect. Like parts have like numbers and functions as the chain apparatus 46 and assembly 40 shown in FIGS. 1 to 15 with the addition of decimal extension "0.1". The chain apparatuses 46.1 and chain assembly 40.1 are substantially the same as chain apparatuses 46 and chain assembly 40 shown in FIGS. 1 to 15 with the following exceptions.

In this embodiment, longitudinally-extending support member 168.1 is a rectangular prism, being rectangular in lateral and longitudinal cross-section, being substantially planar, and having no helical aspect. The support member couples to, integrally forms with and is positioned between the same portions 170.1 and 172.1 of the outer wall 55.1 for the whole length of the elongate member 47.1 in this example. Portions 170.1 and 172.1 of the outer wall are thus elongate and extend longitudinally and are substantially straight with no helical aspect in this example.

FIGS. 18 to 19 show a chain apparatus 46.2 for a chain assembly 40.2 according to a third aspect. Like parts have like numbers and functions as the chain apparatus 46 and assembly 40 shown in FIGS. 1 to 15 with the addition of decimal extension "0.2". The chain apparatuses 46.2 and chain assembly 40.2 are substantially the same as chain apparatuses 46 and chain assembly 40 shown in FIGS. 1 to 15 with the following exceptions.

In this embodiment, longitudinally-extending support member 168.2 is cross-shaped in lateral cross-section. The support member is shaped to form a plurality of chambers 174.2, 176.2, 236 and 238. Each chamber is a circular sector in shape in cross-section and substantially similar in shape in this example.

The support member 168.2 includes a plurality of radially-extending portions 240, 242, 244 and 246 which couple together at the longitudinal axis 50.2 of the elongate member 47.2. The portions of the support member extend radially-outwards from the longitudinal axis and couple to and are integrally formed with circumferentially spaced-apart portions 170.2, 248, 172.2 and 250 of the outer wall 55.2 of the elongate member.

FIGS. 20 to 21 show a chain apparatus 46.3 for a chain assembly 40.3 according to a fourth aspect. Like parts have like numbers and functions as the chain apparatus 46 and assembly 40 shown in FIGS. 1 to 15 with the addition of decimal extension "0.3". The chain apparatuses 46.3 and chain assembly 40.3 are substantially the same as chain apparatuses 46 and chain assembly 40 shown in FIGS. 1 to 15 with the following exceptions.

As seen in FIG. 21, the support member 168.3 is an irregular honeycomb-like structure in shape. The support member is shaped to form a plurality of chambers 174.3 and 176.3, for example, of irregular shape approximating that seen in bone-matrix or other irregular lattice-like arrangements. The support member 168.3 comprises a network of elongate portions 239 that form a plurality of irregular said chambers 174.3 and 176.3 having varied shapes, with at least some of said chambers being irregular polygons in shape in lateral cross-section and at least some of said chambers in lateral cross-section forming enclosures having at least one curved wall. The irregular polygons include irregular triangles, irregular pentagons and irregular hexagons, in this example.

FIGS. 22 to 23 show a chain apparatus 46.4 for a chain assembly 40.4 according to a fifth aspect. Like parts have like numbers and functions as the chain apparatus 46 and assembly 40 shown in FIGS. 1 to 15 with the addition of decimal extension "0.4". The chain apparatuses 46.4 and chain assembly 40.4 are substantially the same as chain apparatuses 46 and chain assembly 40 shown in FIGS. 1 to 15 with the following exceptions.

As seen in FIG. 23, the support member 168.4 includes a first pair of spaced-apart, parallel elongate portions 252 and 254 coupled together via the outer wall 55.4 of the elongate member 47.4 in this embodiment. The support member includes a second pair of spaced-apart, parallel elongate portions 256 and 258 coupled together via the outer wall 55.4 of the elongate member 47.4. The second pair of elongate portions extend perpendicular to the first pair of elongate portions 252 and 254.

Each of the respective pairs of elongate portions 256 and 258 of the support member couples to, is integrally formed with and extends between opposed portions 170.4 and 172.4 of the outer wall 52.4. The elongate portions 252, 254, 256 and 258 of the support member 168.4 are chords in lateral cross-section in this embodiment. A plurality of chambers, in this example nine chambers 174.4, 176.4, 259, 261, 263, 265, 267, 269 and 271 are formed by the support member 168.4 and wall 52.4. Centrally positioned chamber 271 is rectangular in lateral cross-section in this example, and chambers 174.4, 259, 263 and 267 surround chamber 271 and are generally rectangular in lateral cross-section in this example. Chambers 176.4, 261, 265 and 269 are generally triangular in lateral cross-section and are interposed between chambers 174.4 and 259, chambers 259 and 263, chambers 263 and 267, and chambers 267 and 174.4, respectively.

FIGS. 24 to 25 show a chain apparatus 46.5 for a chain assembly 40.5 according to a sixth aspect. Like parts have like numbers and functions as the chain apparatus 46.2 and assembly 40.2 shown in FIGS. 18 to 19 with decimal extension "0.5". replacing decimal extension "0.2" and being added for like parts not previously having a decimal extension. The chain apparatuses 46.5 and chain assembly 40.5 are substantially the same as chain apparatus 46.2 and chain assembly 40.2 shown in FIGS. 18 to 19 with the following exceptions.

The support member 168.5 includes a plurality of radially-extending portions, in this example three portions 240.5, 242.5, 244.5 which couple together at the longitudinal axis 50.5 of the elongate member 47.5. The portions of the support member extend radially-outwards from the longitudinal axis and couple to and integrally form with circumferentially spaced-apart portions 260, 262 and 264 of the outer wall 55.5 of the elongate member. Portion 242.5 of the support member is angular spaced-apart from portion 244.5 by angle $\theta$ that is equal to 60 degrees in this example. Similarly, portion 242.5 of the support member is angular spaced-apart from portion 240.5 by 60 degrees in this example, and portion 244.5 of the support member is angular spaced-apart from portion 240.5 in this example.

FIGS. 26 to 27 show a chain apparatus 46.6 for a chain assembly 40.6 according to a seventh aspect. Like parts have like numbers and functions as the chain apparatus 46 and assembly 40 shown in FIGS. 1 to 15 with the addition of decimal extension "0.6". The chain apparatuses 46.6 and chain assembly 40.6 are substantially the same as chain apparatuses 46 and chain assembly 40 shown in FIGS. 1 to 15 with the following exceptions.

The chain apparatus 46.6 includes an elongate member in the form of a pre-fabricated element, in this example tube 47.6. The tube is an off-the-shelf product not made from additive manufacturing in this example. The tube 47.6 includes first and second sleeve-shaped end portions in this example in the form of sockets or bores 55.6 and 57.6. Ends 49.6 and 51.6 of the tube are thus open.

As seen in FIG. 27, the toroidal members 184.6 and 186.6 couple to the tube via a pair of male portions, in this example tubular projections 268 and 270 that align with, are coaxial with and which extend parallel with axis 50.6 of the tube. The tubular projections 268 and 270 couple to and are integrally formed with the toroidal members 184.6 and 186.6, respectively. The tubular projections are shaped to be received within bores 55.6 and 57.6 such that the annular outer surfaces 273 and 275 of the tubular projections interference fit or press fit with the inner annular surface 277 of tube 47.6. The toroidal members 184.6 and 186.6 thus couple to the tube via interference fit connections in this embodiment.

Radially-extending annular shoulders 272 and 274 extend between the toroidal members 184.6 and 186.6 and tubular projections 268 and 270. The ends 49.6 and 51.6 of the tube 47.6 abut the annular shoulders when the tubular projections are fully inserted within the bores 55.6 and 57.6 such that the outer walls 188.6 of the toroidal members are flush with the outer wall 52.6 of the tube in this example.

Assembly 40.6 thus includes a combination of additive manufactured elements and one or more traditionally pre-fabricated elements. The assembly may thus be said to comprise additively manufactured, permanently linked annular rings for coupling to a pre-fabricated elongate member so as to complete a lock such as bicycle lock 224 shown in FIG. 15, for example.

FIG. 28 shows a chain apparatus 46.7 for a chain assembly 40.7 according to an eighth aspect. Like parts have like numbers and functions as the chain apparatus 46.6 and assembly 40.6 shown in FIGS. 26 to 27 with decimal extension "0.7" replacing decimal extension "0.6" and being added for parts not previously having a decimal extension. The chain apparatuses 46.7 and chain assembly 40.7 are substantially the same as chain apparatuses 46.6 and chain assembly 40.6 shown in FIGS. 26 to 27 with the exception that, in this example, toroidal members 184.7 and 186.7 couple to tube 47.7 via welds 276 and 278.

FIG. 29 shows a chain apparatus 46.8 for a chain assembly 40.8 according to a ninth aspect. Like parts have like numbers and functions as the chain apparatus 46.6 and assembly 40.6 shown in FIGS. 26 to 27 with decimal extension "0.8" replacing decimal extension "0.6" and being added for parts not previously having a decimal extension. The chain apparatuses 46.8 and chain assembly 40.8 are substantially the same as chain apparatuses 46.6 and chain assembly 40.6 shown in FIGS. 26 to 27 with the following exceptions.

The chain apparatus 46.8 includes an elongate member in the form of a pre-fabricated element made from a conventional manufacturing process, in this example rod 47.8. The conventional manufacturing process may be at least one from the group comprising casting, moulding, forming, machining and joining. The rod is an off-the-shelf product not made from additive manufacturing in this example. The rod includes a pair of threaded bores 55.8 and 57.8, and the outer surfaces 273.8 and 275.8 of tubular projections 268.8 and 270.8 are threaded such that the toroidal members 184.8 and 186.8 threadably couple to tube 47.8.

The assemblies referred to above may be described as comprising a plurality of rings or passing links, each of which comprising continuous self-draining channels to allow for the removal of residual non-permanent material related to the additive manufacturing process therefrom. These channels are arranged to provide the internal structure of the links with a plurality of voids. The internal support members may be of varying wall-thicknesses entailing localized reinforcement in order to distribute externally introduced forces/stresses through the structure. For select applications the internal support members may also be perforated to allow additional weight reduction.

The chain assemblies may provide the benefit of custom designing an internal structure to maximize durability and minimize weight. The aforementioned arrangement may be unattainable via non-additive manufacturing processes such as CNC machining or injection moulding techniques.

Each elongate member with annular, in this example toroidal members coupled thereto as herein described may be referred to as eyelets attached to an elongate dogbone-shaped shaft having wide ends and a narrow middle, with the elongate member and eyelets being permanently and intrinsically sealed via an additively manufactured process. The chain apparatus may thus be referred to as an eyelet and dogbone external skeleton that is intrinsically sealed and which comprises a chain that is not a chain.

Each of the chambers of the elongate members 47 to 47.5 as herein described is in communication with the exterior of the elongate member via one or more apertures, as seen in FIG. 22 by aperture 58.4 for elongate member 47.4. However, the presence of apertures between the chambers, or in the outer wall, is not strictly required.

In other embodiments, the internal structure of the elongate member is made first via additive manufacturing, with the outer wall of the elongate member thereafter built over and about the internal structure. In cases where the specific 3D printing, additive manufacturing technology being used does not require self-draining, the apertures through the outer wall are thus not needed for self-draining of unsintered material. However, in such cases the outer wall apertures may still be desirable to achieve weight reduction.

It will be appreciated that many variations are possible within the scope of the invention described herein. For example, while assembly 40 has been described for use as part of a bicycle lock 224 in FIG. 15, the applications to which the ring and passing link forms can be applied includes any field in which an articulating ring or interlocking rings are required to be of high strength, corrosion resistance and of lighter weight than current designs. Additional applications include but are not limited to: locking security devices comprising security chains and bicycle locks; marine chains such as what is used to fasten a heavy duty boat anchor; forestry applications for securing and transporting logs; construction as in those chains used with cranes; military/aerospace links as used in securing cargo and in use for towing; and farming applications in which chains are required.

Support members 168.2, 168.3, 168.4 and 168.5 and corresponding portions of the outer wall 52.2, 52.3, 52.4 and 52.5 of the elongate members 47.2, 47.3, 47.4, and 47.5 described in FIGS. 18 to 25 are helical in shape, extend along the longitudinal axis of the elongate members, and extend around the longitudinal axis of the elongate members a plurality of times in this embodiment. However, in another variation, the support members and said portions of the outer wall may extend longitudinally in an elongate and straight manner, may be substantially planar, and may have no helical aspect.

It will be understood by someone skilled in the art that many of the details provided above are by way of example only and are not intended to limit the scope of the invention which is to be determined with reference to the following claims.

What is claimed is:

1. A chain apparatus having an exterior and comprising:
   a pair of at least partially hollow, enlarged end members, each said end member having a connection aperture extending therethrough; and
   an at least partially hollow elongate member coupled to and extending between the end members, each said member comprising a plurality of internal chambers in fluid communication with said exterior.

2. The chain apparatus as claimed in claim 1, wherein the chain apparatus is made at least in part by additive manufacturing.

3. A chain apparatus comprising:
   a partially hollow elongate member; and
   a pair of partially hollow enlarged end members coupled to and extending outwards at obtuse angles relative to the elongate member, with a first said end member coupling to and extending outwards from the elongate member at a location circumferentially spaced-apart from a second said end member, each said end member having a connection aperture extending therethrough.

4. The apparatus as claimed in claim 3, wherein the elongate member has a longitudinal axis and the first said end member is angularly spaced-apart by 90 degrees from the second said end member.

5. A chain apparatus comprising:
a pair of enlarged end members, each having a connection aperture extending therethrough;
an elongate member coupled to and extending between the end members, the elongate member being hollow at least in part; and
at least one support member positioned within and coupling to the elongate member, the at least one support member functioning to strengthen the elongate member, and the elongate member and the at least one support member being integrally interconnected so as to form a unitary whole.

6. The apparatus as claimed in claim 5 wherein the support member is helical in shape.

7. The apparatus as claimed in claim 5 wherein the support member is one of rectangular in lateral cross-section, cruciform-shaped in lateral cross-section, bone matrix shaped in lateral cross-section and honeycomb-like in lateral cross-section.

8. The apparatus as claimed in claim 5 wherein the support member is shaped to form a plurality of internal chambers, with the chambers having one or more selected from the group comprising: a circular sector in shape in lateral cross-section; a semi-circular shape in lateral cross-section; a rectangular shape in lateral cross-section; a triangular shape in lateral cross-section; an irregular polygon shape in lateral cross-section; a two-dimensional shape in lateral cross-section having at least one curved wall; a pair of parallel elongate portions which are coupled together by an outer wall of the elongate member; and a first pair of parallel elongate portions and a second pair of parallel elongate portions coupled to and extending perpendicular to the first pair of said parallel elongate portions.

9. The apparatus as claimed in claim 5 wherein the elongate member has a longitudinal axis and includes an annular outer wall, and wherein the support member comprises a plurality of radially-extending portions which couple together at the longitudinal axis of the elongate member, extend radially-outwards therefrom and couple to circumferentially spaced-apart interior portions of the annual outer wall of the elongate member.

10. A chain assembly comprising three chain apparatuses of claim 5, wherein one said end member of a first said chain apparatus extends through and couples together with a first said end member of a second said chain apparatus, and a second said end member of the second said chain apparatus extends through and couples together with another said end member of a third said chain apparatus.

11. A bicycle lock comprising:
a lock mechanism; and
at least four chain apparatuses of claim 5, wherein a first said end member of a first said chain apparatus extends through and couples together with a first said end member of a second said chain apparatus, wherein a second said end member of the second said chain apparatus extends through and couples together with a first said end member of a third said end member, wherein a second said end member of the third said chain apparatus extends through and couples together with a first said end member of a fourth said chain apparatus, wherein the chain apparatuses are shaped such that the first said end member of the fourth said chain apparatus is alignable to extend parallel with the first said end member of the second said chain apparatus, and a second said end member of the first said chain apparatus and a second said end member of the fourth said chain apparatus are abutable and alignable to extend parallel with each other, and wherein the lock mechanism is selectively extendable through the second said end member of the first said chain apparatus and the second said end member of the fourth said chain apparatus.

12. The apparatus as claimed in claim 5 wherein at least one of the end members and the elongate member is made at least in part via at least one from the group comprising: casting, moulding, forming, machining and joining.

13. The apparatus as claimed in claim 5 wherein the elongate member is one of a rod and a tube, and wherein the end members selectively couple to the elongate member via one or more of an interference fit connection, welding and a threaded connection.

14. The apparatus as claimed in claim 5, wherein each said end member has an interior, extends about an axis and includes an annular support member positioned within the interior thereof, each said annular support member being planar, and each said annular support member extending about and radially extending outwards from the axis of the end member thereof.

15. The apparatus as claimed in claim 14, wherein each said annular support member is positioned between opposed annular portions of an outer wall of said end member thereof, and wherein each said annular support member extends between, is contiguous with and couples to a circumferentially-extending portion of the outer wall of said end member thereof.

16. The apparatus as claimed in claim 15, wherein each said end member includes at least one radial support member positioned within the interior thereof, each said radial support member extending radially outwards from the axis of the end member thereof and coupling to and extending between the opposed annular portions of the outer wall of said end member thereof.

17. The apparatus as claimed in claim 14 wherein each said end member includes a plurality of braces which couple with the annular support member thereof so as to form chambers, each said chamber of the end member thereof being arc-shaped in planar cross-section, extending radially outwards relative to the axis of the end member thereof and extending circumferentially about said axis of the end member thereof.

18. The chain apparatus as claimed in claim 5, wherein the elongate member and the support member form an internal structure with localized reinforcement in order to distribute externally introduced forces/stresses through the structure.

19. The apparatus as claimed in claim 5, wherein the elongate member has a lateral cross-section that is circular, square, rectangular, diamond-shaped, hexagonal or irregular shaped.

20. The chain apparatus as claimed in claim 5, wherein the chain apparatus is made at least in part by additive manufacturing.

21. The apparatus as claimed in claim 5 wherein the at least one support member and the elongate member form a plurality of adjacent internal chambers.

22. The chain apparatus as claimed in claim 5, wherein the elongate member and the support member form an internal structure which strengthens the chain apparatus while inhibiting weight of the chain apparatus.

23. A chain apparatus comprising:
a pair of enlarged end members, each having a connection aperture extending therethrough;
an elongate member coupled to and extending between the end members, the elongate member being hollow at least in part; and at least one longitudinally-extending support member positioned within and coupling to the elongate member, wherein the members are integrally interconnected so as to form a unitary whole and comprise a structure of adjacent internal chambers, with each said chamber including an aperture extending thereinto.

* * * * *